(12) United States Patent
Bush et al.

(10) Patent No.: US 9,369,367 B2
(45) Date of Patent: Jun. 14, 2016

(54) HOST-ROUTER VIRTUAL TUNNELLING AND MULTIPLE TUNNEL MANAGEMENT

(71) Applicant: TELEFONAKTIEBOLAGET L M ERICSSON (PUBL), Stockholm (SE)

(72) Inventors: Terry Bush, Parker, TX (US); Weihua Pan, Guangzhou (CN); Todd Swierk, Austin, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 454 days.

(21) Appl. No.: 13/693,144

(22) Filed: Dec. 4, 2012

(65) Prior Publication Data

US 2013/0287037 A1 Oct. 31, 2013

Related U.S. Application Data

(60) Provisional application No. 61/638,084, filed on Apr. 25, 2012.

(51) Int. Cl.
| | |
|---|---|
| *H04L 12/56* | (2006.01) |
| *H04L 12/26* | (2006.01) |
| *H04L 29/12* | (2006.01) |
| *H04L 12/46* | (2006.01) |
| *H04L 12/707* | (2013.01) |
| *H04L 12/703* | (2013.01) |
| *H04L 12/751* | (2013.01) |

(52) U.S. Cl.
CPC ............ *H04L 43/10* (2013.01); *H04L 12/4633* (2013.01); *H04L 29/12575* (2013.01); *H04L 45/026* (2013.01); *H04L 45/22* (2013.01); *H04L 45/28* (2013.01); *H04L 2212/00* (2013.01)

(58) Field of Classification Search
CPC .... H04L 12/56; H04L 29/06027; H04L 45/10
USPC ......................................................... 370/401
See application file for complete search history.

(56) References Cited

U.S. PATENT DOCUMENTS

| | | | | |
|---|---|---|---|---|
| 6,865,184 | B2 * | 3/2005 | Thubert et al. ................. | 370/401 |
| 7,188,191 | B1 * | 3/2007 | Hovell et al. .................. | 709/245 |
| 7,586,841 | B2 | 9/2009 | Vasseur | |
| 7,801,021 | B1 * | 9/2010 | Triantafillis et al. .......... | 370/216 |
| 7,852,778 | B1 | 12/2010 | Kompella | |
| 7,937,492 | B1 | 5/2011 | Kompella et al. | |
| 8,792,501 | B1 * | 7/2014 | Rustagi et al. ........... | 370/395.53 |
| 2005/0232146 | A1 | 10/2005 | Lee et al. | |
| 2008/0310326 | A1 | 12/2008 | Shaw et al. | |
| 2009/0225652 | A1 | 9/2009 | Vasseur et al. | |

OTHER PUBLICATIONS

Postel, J. Internet Control Message Protocol. Network Working Group RFC 792. Sep. 1981.
Nordmark, E et al. Basic Transition Mechanisms for IPv6 Hosts and Routers. Network Working Group RFC 4213. Oct. 2005.

(Continued)

*Primary Examiner* — Shaq Taha

(57) ABSTRACT

A virtual tunnel method is described herein which implemented by a host and next hop routers to address a problem that is related to synchronizing active tunnel(s) and active link(s) between the host and next hop routers. Furthermore, a multiple tunnel management method is described herein which implemented by a host to address the problem that is related to synchronizing active tunnel(s) and active link(s) between the host and multiple next hop routers.

22 Claims, 19 Drawing Sheets

(56) References Cited

OTHER PUBLICATIONS

Conta, A et al. Internet Control Message Protocol (ICMPv6) for the Internet Protoco Version 6 (IPv8) Specification. Network Working Group RFC 4443. Mar. 2006.

Narten, T et al. Neighbor Discovery for IP version 6 (IPv6). Network Working Group RFC 4861. Sep. 2007.

Katz, D et al. Bidirectional Forwarding Detectlon (BFD). Internet Engineering Task Force (IETF) RFC 5880. Jun. 2010.

Katz, D et al. Bidirectional Forwarding Detection (BFD) for IPv4 and IPv6 (Single Hop). Internet Engineering Task Force (IETF) RFC 5881, Jun. 2010.

Katz, D et al. Generic Application of Bidirectional Forwarding Detection (BFD). Internet Engineering Task Force (IETF) RFC 5882. Jun. 2010.

Katz, D et al. Bidirectional Forwarding Detection (BFD) for Multihop Paths. Internet Engineering Task Force (IETF) RFC 5883. Jun. 2010.

Aggarwal, R et al. Bidirectional Forwarding Detection (BFD) for MPLS Label Switched Paths (LSPs Internet Engineering Task Force (IETF) RFC 5884. Jun. 2010.

3GPP, $3^{rd}$ Generation Partnership Project: Technical Specification Group Services and System Aspects; IP Multimedia Subsystem (IMS): Stage 2 (Release 11), 3GPP TS 23.228 v11.3.0. Dec. 2011.

Gsenger, O. Secure Anycast Tunneling Protocol (SATP). draft-gsenger-secure-anycast-tunneling-protocol-02.txt. Internet Engineering Task Force. May 6, 2008.

Huitema. An Anycast Prefix for 6to4 Relay Routers; RFC 3068.txt. Jun. 1, 2011.

Patridge, et al. Host Anycasting Service; RFC 1546.txt. Nov. 1, 1993.

Bonica, et al. "Tracing Requirements for Generic Tunnels" draft-ietf-ccamp-tracereq-05. Internet Draft. Jun. 2003.

Colitti, et al.: "IPv6-in-IPv4 Tunnel Discovery: Methods and Experimental Results". pp. 30-38. Apr. 1, 2004.

Fu, et al.: "A Proposal for Generic Traceroute Over Tunnels". Draft-fu-ccamp-traceroute-00.txt. Jun. 23, 2003.

\* cited by examiner

MULTIPLE TUNNELS/SINGLE
ACTIVE LINK

NON-SYNCHRONIZED
TUNNEL & LINK

LINK SWITCHOVER WITHOUT
TUNNEL SWITCHOVER

HOST-ROUTER VIRTUAL TUNNELLING AND MULTIPLE TUNNEL MANAGEMENT

CLAIM OF PRIORITY

This application claims the benefit of U.S. Provisional Application Ser. No. 61/638,084 filed on Apr. 25, 2012. The contents of this document are hereby incorporated by reference herein.

RELATED APPLICATION

This application is related to the co-assigned U.S. patent application Ser. No. 13/693,194 entitled "Host-Router Virtual Tunnelling and Multiple Tunnel Management". The contents of this document are hereby incorporated herein by reference for all purposes.

TECHNICAL FIELD

The present invention relates to a virtual tunnel method implemented by a host and next hop routers to address a problem related to synchronizing active tunnel(s) and active link(s) between the host and next hop routers. Furthermore, the present invention relates to the host and next hop routers which implement the virtual tunnel method. In addition, the present invention relates to a multiple tunnel management method implemented by a host to address the problem related to synchronizing active tunnel(s) and active link(s) between the host and multiple next hop routers. Moreover, the present invention relates to the host which implements the multiple tunnel management method.

BACKGROUND

The following abbreviations and terms are herewith defined, at least some of which are referred to within the following description of the state of the art and the present invention.
3GPP 3$^{rd}$ Generation Partnership Project
ACL Access Control List
BFD Bidirectional Forwarding Detection
CS Circuit Switch
DA Destination Address
ICMP Internet Control Message Protocol
IMS IP Multimedia Subsystem
IM-MGW IP Multimedia Media Gateway Function
IP Internet Protocol
IPLx IP Level x
IPv4 IP version 4
IPv6 IP version 6
ISO International Organization for Standardization
LSP Label Switch Path
MGW Media Gateway
MPLS Multi-Protocol Label Switching
MSCS Mobile-Services Switching Center
NHR Next Hop Router
NUD Network Unreachability Detection
OSI Open System Interconnect
RFC Request for Comment
SA Source Address
TS Technical Specification
TTL Time To Live
Next Hop Router (NHR): The first router in the path from the host to the destination network.
IMS Network—IPv4 and IPv6

The IP Multimedia Subsystem (IMS) originally specified the use of the new IP version 6 (IPv6) technology and later allowed the legacy IP version 4 (IPv4), but the intent is to move forward with IPv6 communications. Hence, the network providers are requiring IPv6 interfaces with their IMS networks. However, the access nodes from the previous non-IMS technologies, e.g.:
   Call Server, e.g., Mobile-Services Switching Center (MSCS)
   Media Gateway (MGW)
may or may not support native IPv6, and often do not. Thus, the CS's MSCS is having capabilities shown as MGCF added so it can interface with the IMS network. Likewise, the CS's MGW is having capabilities shown as IM MGW added so it can support the IMS Mn and Mb interfaces. FIG. 1 (PRIOR ART) is a diagram that illustrates the logical interfaces CS 102a and 102b respectively between the IMS network's IMS-MGW 104 and MGCF 106 and the CS network's MGW 108 and MSCS 110—this diagram is part of TS 23.228 3GPP; TS Group Services and System Aspects; IP Multimedia Subsystem (IMS); Stage 2 (Release 11), 2011-12 (the contents of which are incorporated herein by reference). In this case, IMS components, such as the Serving-Call Session Control Functions (S-CSCF) 112 and the Media Resource Function Processor (MRFP) 114 respectively communicate with the MGCF 106 and the IMS-MGW 104 using the IPv4 and/or IPv6 (preferred) protocols. These IP capable host devices—S-CSCF 112/MGCF 106 and MRFP 114/IMS-MGW 104—will communicate with each other over an IP capable network infrastructure composed of IP routers which are not shown in FIG. 1 because they are associated with physical connections rather than logical connections.

The IMS-MGW 104 and the MGCF 106 both require IPv4 and IPv6 capabilities and so that these devices can utilize the existing direct-connected IPv4 infrastructure they both implement an IPv4 to IPv6 transition technique known as tunneling. FIG. 2 (PRIOR ART) illustrates the IMS-MGW 104 and MGCF 106 which function as hosts interacting with their next hop routers 202 and 204 which are associated with the IMS subsystem IPv6 206 utilizing tunneling where IPv6 is tunneled over IPv4 so that the existing host IPv4 infrastructure does not change and the IPv6 is managed at the host's application end point. The next hop routers 202 and 204 are part of the aforementioned IP network infrastructure. The next hop routers 202 and 204 are capable of tunneling over IPv4 the native IPv6 traffic between the IMS components—S-CSCF 112/MGCF 106 and MRFP 114/IMS-MGW 104.

The Internet Protocol (IP) may utilize tunneling techniques to transport information for various reasons:
   Security
   IPv4 to IPv6 Transition
   IPv6 to IPv4 Transition
   Packet Encapsulation FIG. 3 (PRIOR ART) illustrates how tunneling is realized by encapsulating a packet 300 with its original IP header 302 and data 304 within a new IP header 306 to form an encapsulated packet 308. The IP headers 302 and 306 may be any combination of IPv4 or IPv6. For instance, the original IP header 302 is an IPv6 IP header and the new IP header 306 is an IPv4 IP header, or the original IP header 302 is an IPv4 IP header and the new IP header 306 is an IPv6 IP header, or the original IP header 302 is an IPv4 IP header and the new IP header 306 is an IPv4 IP header, or the original IP header 302 is an IPv6 IP header and the new IP header 306 is an IPv6 IP header Tunnel Endpoints FIG. 4 (PRIOR ART) illustrates a tunnel 400 (which includes the encapsulated packet 308) with two tunnel end points 402a and 402b each represented by an IP address associated with each IP layer. For example, an IPv6 over IPv4 tunnel 400 would have both an IPv6 address (IP Level 2) 404a and 404b and an IPv4 address (IP Level 1) 406a and 406b at each tunnel endpoint 402a and 402b. In particular, the tunnel endpoint 402a would have an IP address $L2_a$ 404a and an IP address $L1_a$ 406a while the tunnel endpoint 404b would have IP address $L2_b$ 404b and IP address $L1_b$ 406b. The IP addresses 406a and 406b are used to route between a host (e.g., MGCF 106) and a router (e.g., router 204) as they are used in the outside new IP header 306 And, the IP addresses 404a and 404b are used to route between the host and the far end device (see FIG. 6). The word "level" is used herein to distinguish the different stacked IP headers and is not to be confused with the term "layer" which is used in the International Organization for Standardization (ISO) Open System Interconnect (OSI) 7-layer Reference Model.

Tunnels vs. Links

Tunnels may exist between a host and routers (host-routers) or between the routers themselves (router-router). An algorithm for tunneling IPv6 over IPv4 between a host-and-routers and between routers-and-routers is described in RFC 4213 "Basic Transition Mechanisms for IPv6 Hosts and Routers" October 2005 (the contents of which are incorporated by reference herein). The IP protocol operates at the Network Layer, or Layer 3, of the ISO OSI Reference Model. This implies that the tunnel operation is also at Layer 3.

As shown in FIG. 5 (PRIOR ART), the host 500 when connecting to next hop routers $502_1$ and $502_2$ (only two shown) usually utilizes redundant paths $506_1$ and $506_2$ to the adjacent routers $502_1$ and $502_2$ to ensure connectivity even if there is a single point of failure (see also FIG. 2). The host 500 has an algorithm 510 which determines which link or links are utilized when communicating via its adjacent routers $502_1$ and $502_2$ to the far end device 504. This algorithm 510 will therefore determine the physical path(s) $506_1$ and $506_2$ used for communicating via the adjacent router(s) $502_1$ and $502_2$ to the far end device 504. Note: the physical paths $506_1$ and $506_2$ along with their associated data link protocol operate at the Data Link (Layer 2) and the Physical (Layer 1) of the OSI model and are therefore segregated from the tunneling which operates at Layer 3.

The host 500 to survive a single point of failure needs a minimum of two paths $506_1$ and $506_2$ connected to the two routers $502_1$ and $502_2$. Although more paths and routers may be utilized, the two-path algorithm is generally deployed. The adjacent routers $502_1$ and $502_2$ generally have an inter-router link 512 (the link inter-connecting each of the adjacent routers $502_1$ and $502_2$) to provide alternative path routing for both ingress traffic and egress traffic with respect to the host 500 and the network (far end device 504).

As shown in FIG. 6 (PRIOR ART), there is a host-router configuration in which the host 500 inter-connects to its adjacent or next hop router $502_1$ (for example) using one network protocol "A", e.g., IPv4, while an application 602 on the host 500 needs to communicate with another application 606 on the far end device 504 using a different network protocol B, e.g., IPv6. Thus, to allow the host 500 to communicate with the far end device 504 there is established a host-router tunnel $604_1$ which uses network protocol "A" with network protocol "B" embedded therein.

As shown in FIG. 7 (PRIOR ART), if a host-router tunnel is utilized, then the host 500 will need a tunnel $604_1$, $604_2$ ... $604_n$ to each of its adjacent routers $502_1$, $502_2$ ... $502_n$. Note: that a tunnel, and its traffic, between two end points may utilize different physical paths over time.

Tunneling and Routing

Host-to-Router Direction

In the host 500 to router $502_1$ (for example) packet flow direction, the original IP header contains:
  Destination IP Address—Far end device's address
  Source IP Address—Host's address
The host 500 will encapsulate the original IP packet with a new IP header. The new IP header contains:
  Destination IP Address—Router's Tunnel Endpoint Address
  Source IP Address—Host's Tunnel Endpoint Address
Once the packet is removed from the tunnel by the router $502_1$, the external IP header is removed and the original IP header is then used to route the packet.

Router-to-Host Direction

In the router $502_1$ (for example) to host 500 packet flow direction, the original IP header contains:
  Destination IP Address—Host address
  Source IP Address—Originator of the IP packet (far end device 504)
The router $502_1$ will encapsulate the original packet with the tunnel header. The new IP header contains:
  Destination IP Address—Host's Tunnel Endpoint Address
  Source IP Address—Router's Tunnel Endpoint Address Tunnel Integrity Check Tunnels $604_1$, $604_2$, $604_n$ (for example) are effectively managed by software and are therefore subject to failure. The host 500 (for example) could check the tunnel's integrity by running heartbeat messages at the tunnel level. Examples of such a heartbeat mechanism 608 include:

Bidirectional Forwarding Detection (BFD):
  RFC 5880—Bidirectional Forwarding Detection (BFD), Standard, June 2010.
  RFC 5881—Bidirectional Forwarding Detection (BFD) for IPv4 and IPv6 (Single Hop), June 2010.
  RFC 5883—Bidirectional Forwarding Detection (BFD) for Multihop Paths, June 2010.
  RFC 5884—Bidirectional Forwarding Detection (BFD) for MPLS Label Switched Paths (LSPs), June 2010.
  RFC 5882—Generic Application of Bidirectional Forwarding Detection (BFD), June 2010.

Internet Control Message Protocol (ICMP):
  RFC 792—Internet Control Message Protocol, September 1981.
  RFC 4443—Internet Control Message Protocol (ICMPv6) for the Internet Protocol Version 6 (IPv6) Specification, March 2006.

Network Unreachability Detection (NUD):
  RFC 4861—Neighbor Discovery for IP version 6 (IPv6), September 2007.

Note: The contents of these eight documents are hereby incorporated by reference herein.

Time To Live (TTL) and Hop Limit

There is a field in the IPv4 header, Time To Live (TTL), and in the IPv6 header, Hop Limit, which ensures that a packet caught in a routing loop will eventually be discarded. Plus, when a router $502_1$, $502_2$ ... $502_n$ (for example) receives an IP packet, the router $502_k$, $502_2$ ... $502_n$ decrements the TTL/Hop Limit field. If the result is zero (0), then the packet is discarded.

Problems

The host 500 (for example) which has multiple tunnels $604_1$, $604_2$ ... $604_n$ one to each of its adjunct routers $502_k$, $502_2$ ... $502_n$ must know the operational status of each and every tunnel $604_1$, $604_2$ ... $604_n$. Furthermore, the tunnels $604_1, 604_2 \ldots 604_n$ which are utilized for communications would depend on the Layer 1/2 active path(s) $506_1, 506_2 \ldots 506_n$ to gain the most efficient routing. This implies that the host's Layer 3 function would need to be cognizant of the Layer 1/2 functions which is not the intent of the ISO OSI Reference Model. This situation can be problematic because some tunnels $604_1, 604_2 \ldots 604_n$ may be intended to be active while others are standby, while some links $506_1, 506_2 \ldots 506_n$ may be intended to be active while other links are standby. And, if the active tunnels $604_1, 604_2 \ldots 604_n$ and the active links $506_1, 506_2 \ldots 506_n$ do not align, then less efficient routing will occur. Referring to FIGS. 8A-8D (PRIOR ART), there are shown two cases—FIGS. 8A and 8B—which lead to efficient routing and two cases—FIGS. 8C and 8D—which lead to less efficient routing. In FIG. 8A, the host 500 and routers $502_1$ and $502_2$ have active tunnels $604_1$ and $604_2$ and active links $506_1$ and $506_2$ which are synchronized resulting in efficient routing of packets. In FIG. 8B, the host 500 and router $502_1$ have an active tunnel $604_1$ and an active link $506_1$ which are synchronized resulting in efficient routing of packets. In FIG. 8C, the host 500 has an active tunnel $604_1$ and an active link $506_1$ with router $502_1$ and the host 500 has an active tunnel 802 but no active link with router $502_2$ which results in less efficient routing. In FIG. 8C, assuming that one tunnel is all that is needed by the host 500, then the active tunnel $604_1$ associated with the active link $800_1$ should be used which avoids the extra hop between the pair of routers $502_1$ and $502_2$. In FIG. 8D, the host 500 has an active link $506_1$ but no active tunnel with router $502_1$ and at the same time the host 500 has an active tunnel 802 but no active link with router $502_2$ which results in less efficient routing. Accordingly, there is a need to address these shortcomings and other shortcoming associated with the state-of-the-art.

SUMMARY

A host, a next hop router, a virtual tunnel method, and a multiple tunnel management method which address a problem related to synchronizing active tunnel(s) and active link(s) between the host and next hop routers is described in the independent claims of the present application. Advantageous embodiments of the host, the next hop router, the virtual tunnel method, and the multiple tunnel management method have been described in the dependent claims of the present application.

In one aspect, the present invention provides a host (and a virtual tunnel method implemented thereby) which interfaces with at least one of a plurality of next hop routers to communicate with a far end device. The host comprises an input interface, an output interface, and a tunnel management device. The tunnel management device is arranged to provision a single tunnel to transmit a packet (destined for the far end device) from the output interface to one of the next hop routers. The single tunnel may terminate at anyone of the next hop routers. The single tunnel is configured to transmit the packet which contains an original IP header which is encapsulated within a new IP header. The packet also contains data. The original IP header comprises: a source IP address indicative of an IP address of the host; and a destination IP address indicative of an IP address of the far end device. The new IP header comprises: a source IP address indicative of a tunnel endpoint IP address of the host; and a destination IP address indicative of a tunnel endpoint IP address for all of the next hop routers. The host by implementing the virtual tunnel method has many advantages when compared to prior art solutions such as (for example): (1) simplicity; (2) less provisioning—a single tunnel is established at the host as opposed to multiple tunnels; (3) no dependency between tunnel management and link management; (4) efficient routing via automatic synchronization of the active tunnel and the active link; and (5) not dependent upon a tunnel integrity verification.

In another aspect, the present invention provides a next hop router (and a virtual tunnel method implemented thereby) which interfaces with a host and one or more other next hop routers. The host communicates with a far end device through at least one of the next hop router and the one or more other next hop routers. The next hop router comprises an input interface, an output interface, and a tunnel management device. The tunnel management device arranged to provision a tunnel to forward a packet originated by the far end device and destined for the host. The tunnel is configured to transmit the packet which contains an original IP header encapsulated within a new IP header. The packet also contains data. The original IP header comprises: a source IP address indicative of an IP address of the far end device; and a destination IP address indicative of an IP address of the host. The new IP header comprises: a source IP address indicative of a tunnel endpoint IP address for the next hop router and the one or more other next hop routers; and a destination IP address indicative of a tunnel endpoint IP address for the host. The next hop router by implementing the virtual tunnel method has many advantages when compared to prior art solutions such as (for example): (1) simplicity; (2) less provisioning—a single tunnel is established at the host as opposed to multiple tunnels; (3) no dependency between tunnel management and link management; (4) efficient routing via automatic synchronization of the active tunnel and the active link; and (5) not dependent upon a tunnel integrity verification.

In yet another aspect, the present invention provides a host (and a multiple tunnel management method implemented thereby) which interfaces with a plurality of next hop routers. The host has multiple tunnels with the next hop routers. The host comprises an input interface, an output interface, a storage device, and a tunnel management device. The tunnel management device is arranged to send a first integrity check to the next hop routers, where the first integrity check has a hop limit set to "H" so that only the next hop router which has an active host-router link would be able to successfully process the first integrity check (note: this next hop router is referred to hereinafter as the active router). The tunnel management device receives a first successful integrity check indication from the active router only if the active router has the active host-router link and was able to successfully process the first integrity check (note: the remaining next hop routers cannot successfully process the first integrity check). The tunnel management device maintains in the storage device a router/tunnel table which indicates a result of the first integrity check and in particular which one of the plurality of next hop routers if any is the active router. The tunnel management device sends a second integrity check which has a hop limit set to "H+1" so that all of the next hop routers which has a host-router link would be able to successfully process the second integrity check. The tunnel management device receives a second successful integrity check indication from each of the next hop routers which have the host-router link and were able to successfully process the second integrity check. The tunnel management device maintains in the storage device the router/tunnel table which indicates the result of the first integrity check and in particular which one of the plurality of next hop routers if any is the active router, and a result of the second integrity check and in particular which of the plurality of next hop routers have the host-router link and were able to successfully process the second integrity check.

The tunnel management device performs another first integrity check and second integrity check and maintains an updated router/tunnel table to indicate the results of the repeated first integrity check and the second integrity check. The tunnel management device then compares the router/tunnel table and the updated router/tunnel table to determine if there are normal conditions, a link failure, a router failure, or a tunnel failure without a router failure and then acts accordingly to address any failure. The host by implementing the multiple tunnel management method has many advantages when compared to prior art solutions such as (for example): (1) efficient routing via synchronization of the active tunnel and the active link; (2) determining the source of the issue; (3) incorporated tunnel integrity verification; and (4) traffic recovery given a failed router or tunnel.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
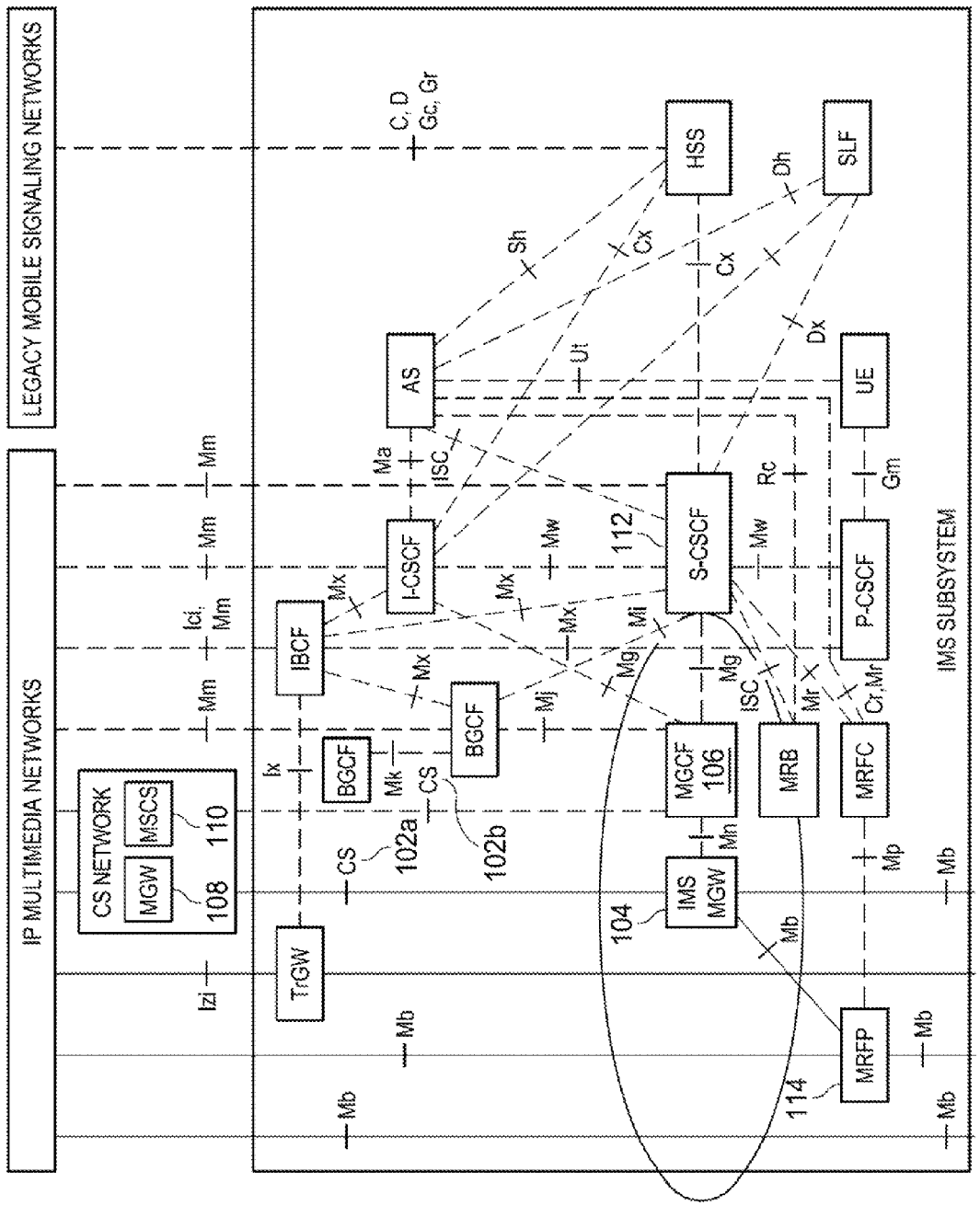
FIG. 1 (PRIOR ART) is a diagram of an IMS subsystem, a CS network, IP multimedia networks, and legacy mobile signaling networks which is used to help explain the state-of-the art and the problems associated with the state-of-the art which are addressed by the present invention.
Figure 2:
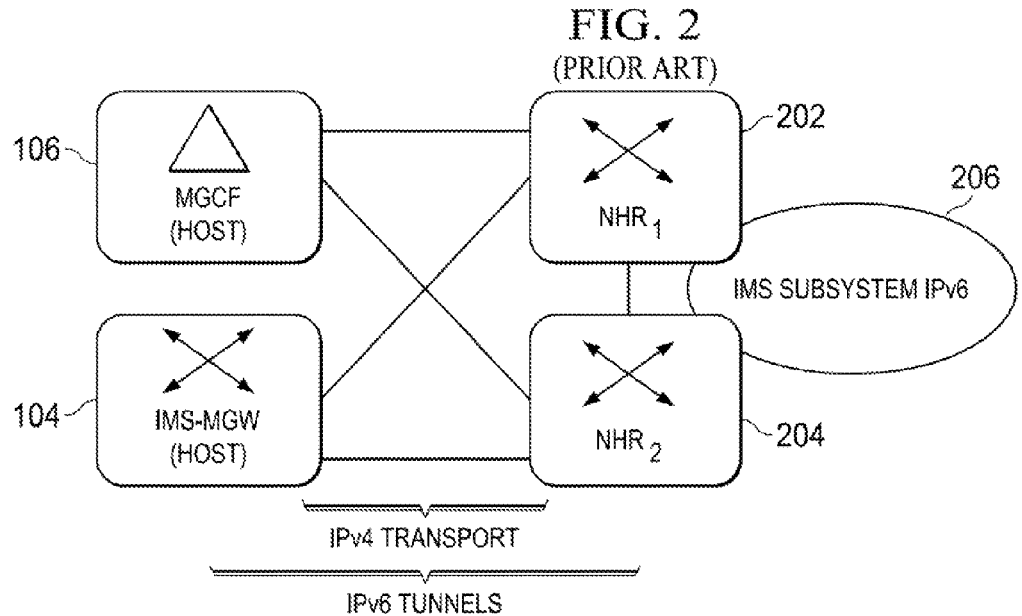
FIG. 2 (PRIOR ART) is a diagram of an IMS-MGW-MGCF-routers configuration which is used to help explain the state-of-the art and the problems associated with the state-of-the art which are addressed by the present invention.
Figure 3:
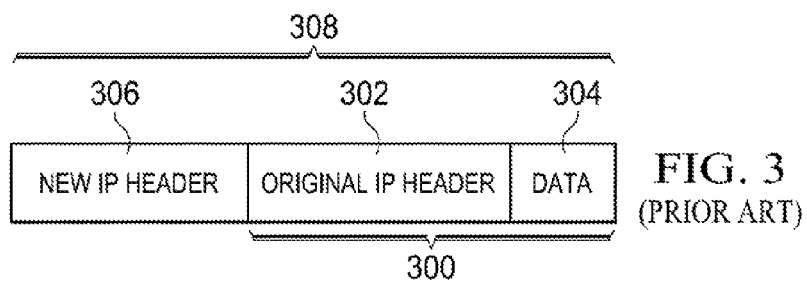
FIG. 3 (PRIOR ART) is a diagram of an encapsulated packet which is used to help explain the state-of-the art and the problems associated with the state-of-the art which are addressed by the present invention.
Figure 4:
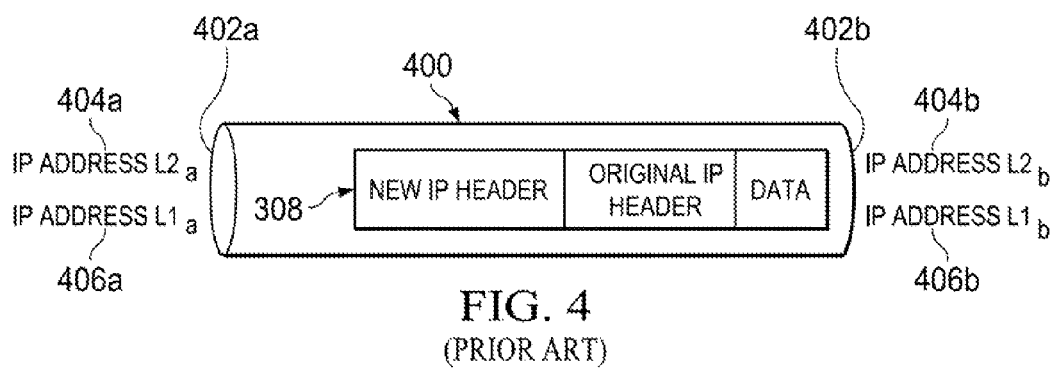
FIG. 4 (PRIOR ART) is a diagram of a tunnel which is used to help explain the state-of-the art and the problems associated with the state-of-the art which are addressed by the present invention.
Figure 5:
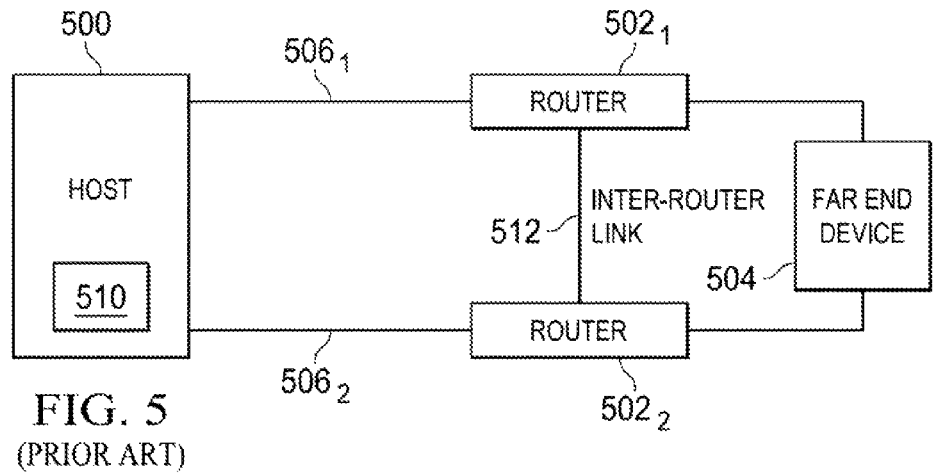
FIG. 5 (PRIOR ART) is a diagram of a host-routers-far end device configuration which is used to help explain the state-of-the art and the problems associated with the state-of-the art which are addressed by the present invention.
Figure 6:
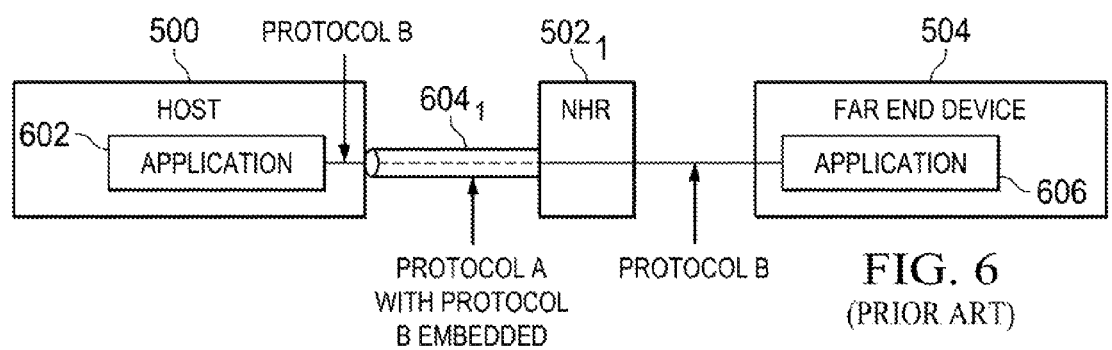
FIG. 6 (PRIOR ART) is a diagram of a host-router-far end device configuration which is used to help explain the state-of-the art and the problems associated with the state-of-the art which are addressed by the present invention.
Figure 7:
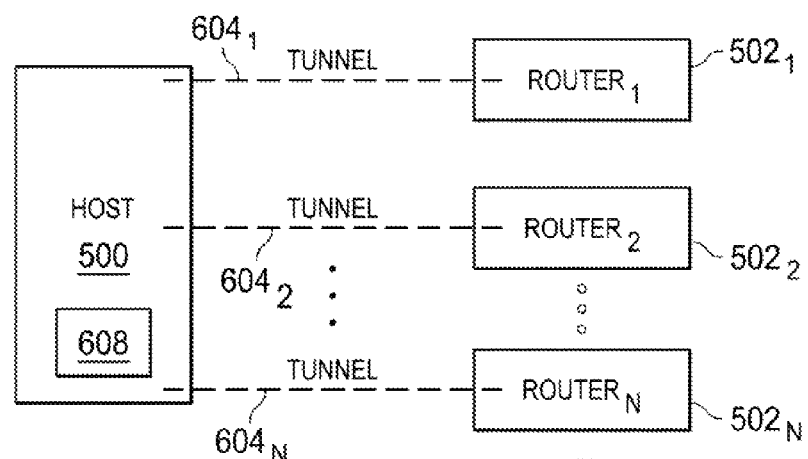
FIG. 7 (PRIOR ART) is a diagram of a host-routers configuration which is used to help explain the state-of-the art and the problems associated with the state-of-the art which are addressed by the present invention.
Figure 8A:
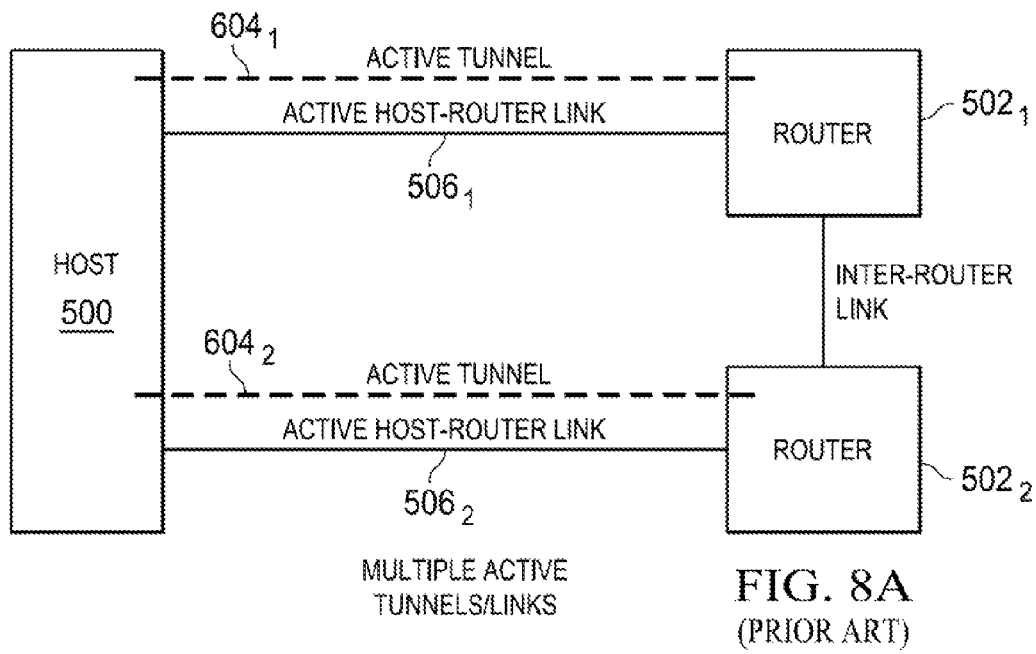
FIG. 8A (PRIOR ART) is a diagram of a host-routers configuration which is used to help explain the state-of-the art and the problems associated with the state-of-the art which are addressed by the present invention.
Figure 8B:
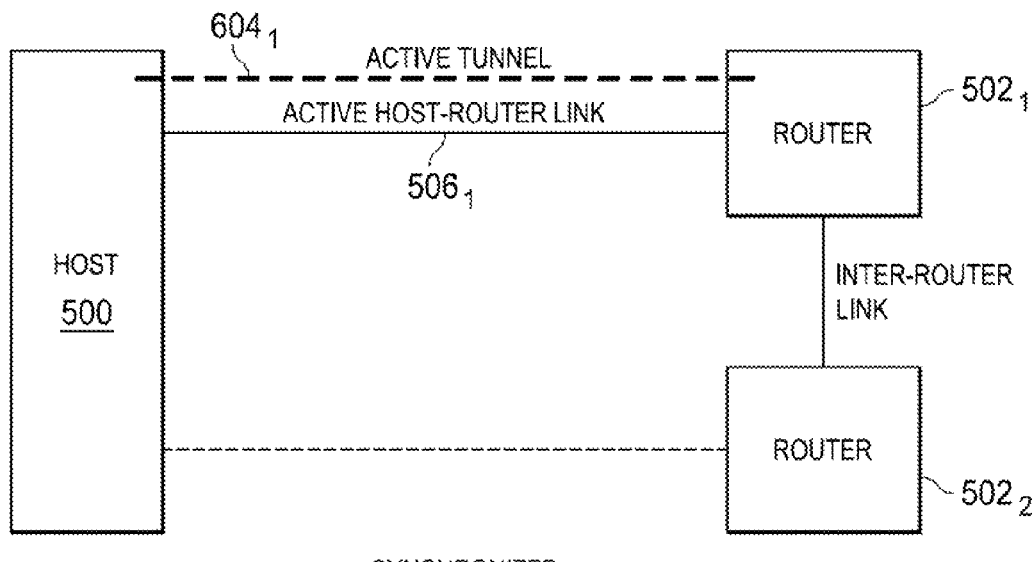
FIG. 8B (PRIOR ART) is a diagram of a host-routers configuration which is used to help explain the state-of-the art and the problems associated with the state-of-the art which are addressed by the present invention.
Figure 8C:
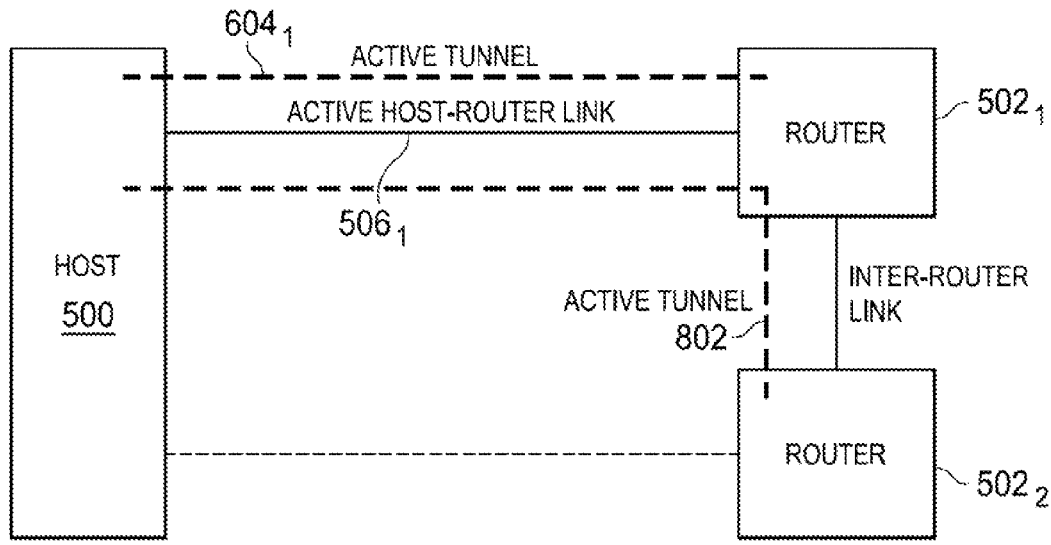
FIG. 8C (PRIOR ART) is a diagram of a host-routers configuration which is used to help explain the state-of-the art and the problems associated with the state-of-the art which are addressed by the present invention.
Figure 8D:
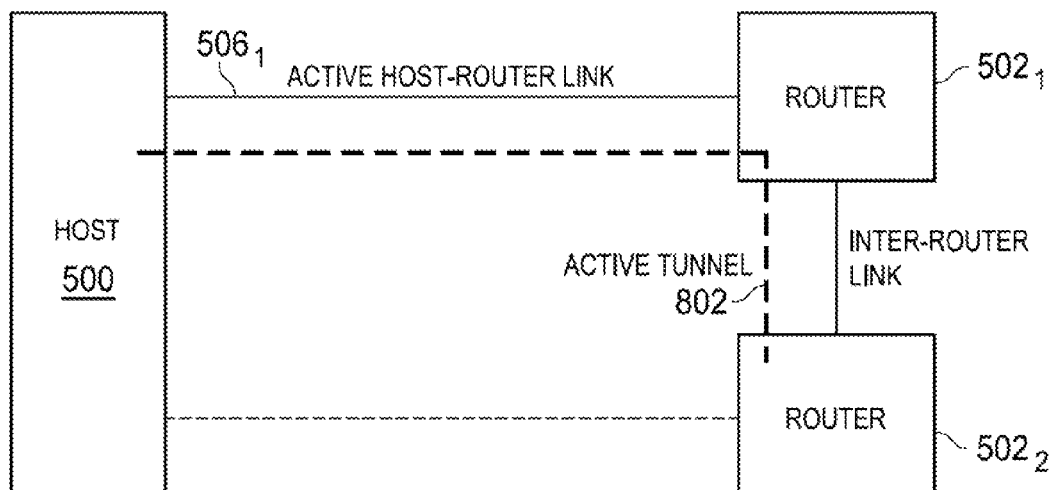
FIG. 8D (PRIOR ART) is a diagram of a host-routers configuration which is used to help explain the state-of-the art and the problems associated with the state-of-the art which are addressed by the present invention.

The present invention described herein includes two embodiments where the first embodiment relates to a virtual tunneling method and the second embodiment relates to a multiple tunnel management method. In the virtual tunneling method, the host has a tunnel management device that establishes one logical tunnel that may terminate at any of its adjacent routers (also referred to herein as next hop routers). This simplifies the host's tunnel management. Plus, this removes any dependency of synchronizing the active tunnel with the active link (see FIGS. 9-14). In the multiple tunnel management method, the host has multiple tunnels (not virtual tunneling) to its adjacent routers plus a tunnel management device which implements a tunnel status algorithm and performs the following—(1) informs the host about which tunnel aligns with which active link; and (2) informs the host on the location of a fault if one occurs—resulting in an unique and optimized multiple tunnel management (see FIGS. 15-21). Note: The IMS's host and routers can implement the virtual tunneling method and the multiple tunnel management method. However, it should be appreciated that the virtual tunneling method and the multiple tunnel management method described herein can be implemented by any network device which utilizes IP tunneling technology.

First Embodiment

Virtual Tunneling

Referring to FIGS. 9-14, there are several drawings used to help explain the features and steps of the virtual tunneling method in accordance with a first embodiment of the present invention. To explain the virtual tunneling method a basic description is provided below first and then a host-to-router traffic flow scenario is described with respect to FIGS. 9-10 and then a router-to-host traffic flow scenario is described with respect to FIGS. 11-14.

Given a host-router tunnel configuration, the host 900 is provisioned with a single tunnel 902 and no more regardless of the number of adjacent routers $904_1, 904_2 \ldots 904_n$. This means that the tunnel 902 is established with source and destination IPL1 addresses (recall: IPL1 address are used in the outside IP header to route between the host-router while IPL2 addresses are used in the original IP header to route between the host-far end device). From the host's perspective, the destination IPL1 address is the router's tunnel endpoint address. The host 900's provisioning of the single tunnel 902 regardless of the number of adjacent routers $904_1, 904_2 \ldots 904_n$ is discussed in more detail below with respect to FIGS. 9-10.

On each router $904_1, 904_2 \ldots 904_n$, a tunnel 1102/1302 is provisioned with a remote tunnel endpoint at the host. All routers $904_1, 904_2 \ldots 904_n$ associated with the virtual tunnel 1102/1302 use the same source IPL1 address. This implies that the router's IPL1 address must be internal-private, i.e., no other nodes in the network, with the exception of the host 900 and its adjacent routers $904_1, 904_2 \ldots 904_n$ (those routers participating in the host-router tunneling), are aware of the IPL1 address. This is not an issue from a routing perspective. The routers $904_1, 904_2 \ldots 904_n$'s provisioning of the tunnel 1102 in which there is an operative interface to the host 900 is discussed in more detail below with respect to FIGS. 11-12 (case 1).

Figure 13:
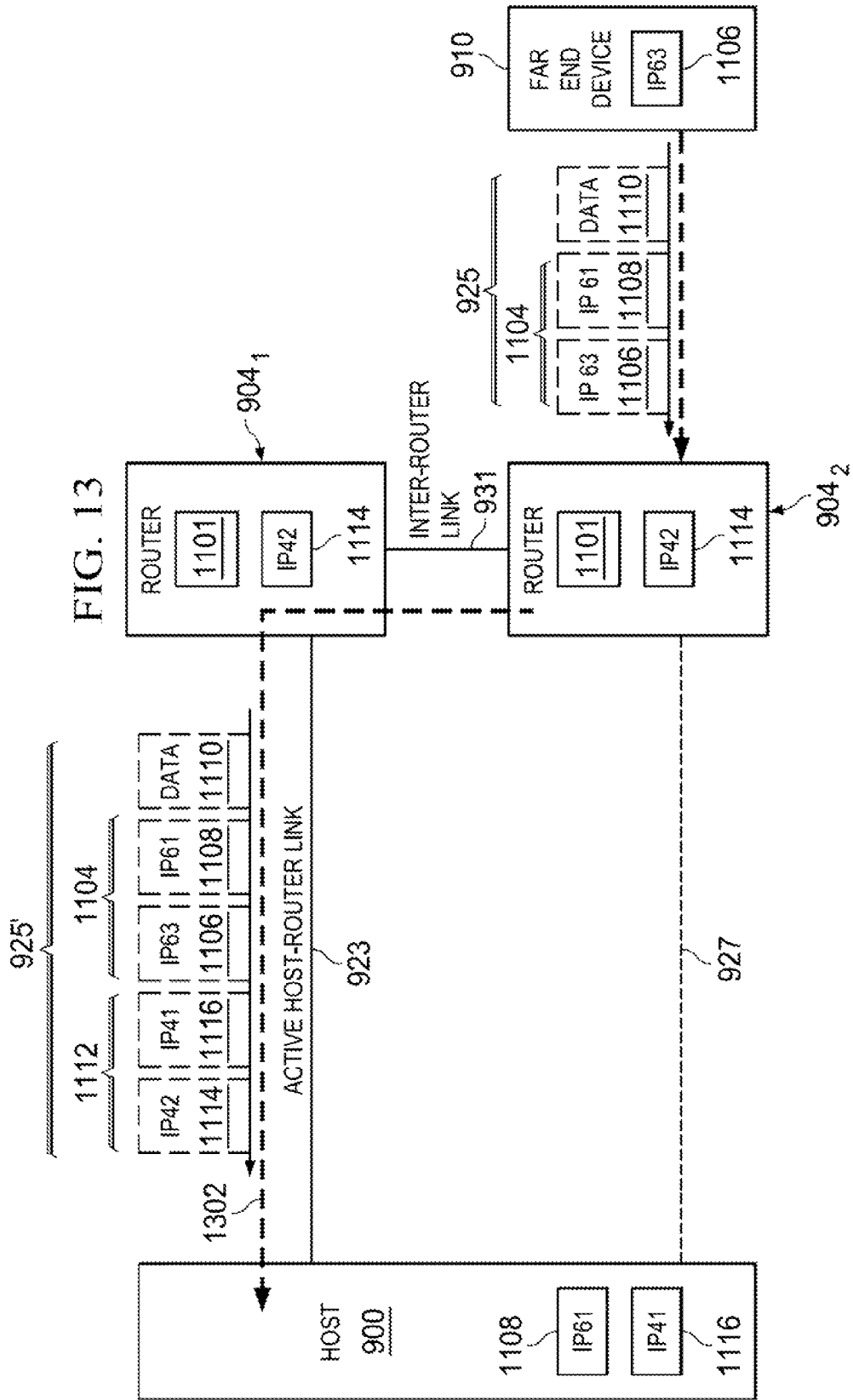
FIG. 13 is a diagram of a host-routers-far end device configuration which is used to explain how the host and next hop routers can implement the virtual tunneling method in accordance with the first embodiment of the present invention.
Figure 14:
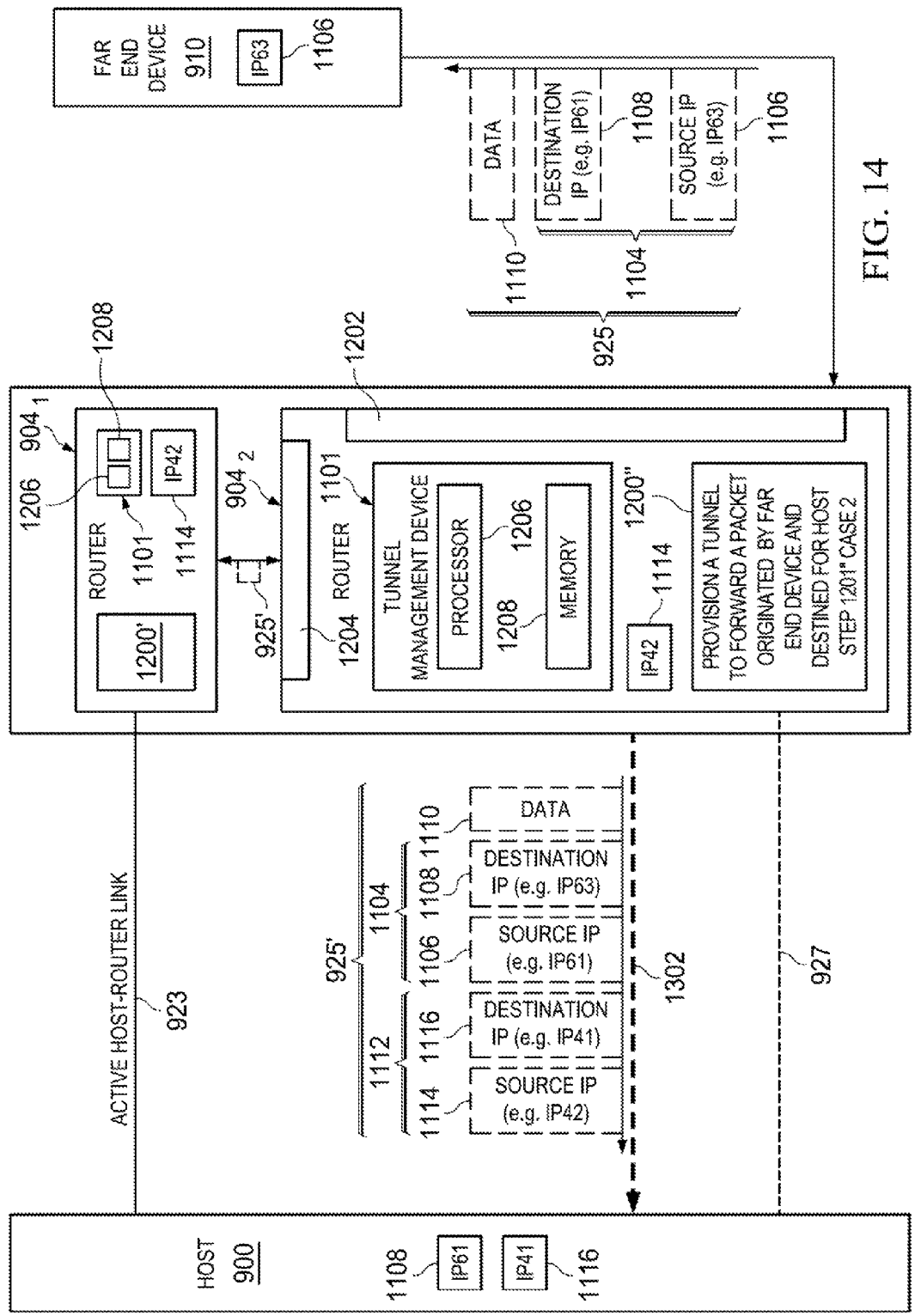
FIG. 14 is a diagram of a host-routers-far end device configuration which is used to explain how the host and next hop routers can implement the virtual tunneling method in accordance with the first embodiment of the present invention.

In addition, the adjacent routers $904_1, 904_2 \ldots 904_n$ (participating in the tunneling) will need to allow receipt of a packet with the common router tunnel endpoint IPL1 address as the source address of the packet and forward that packet to the next hop router or host 900 (see FIGS. 13-14—case 2). The reason this situation might occur is if an interface is down between the host 900 and the router $904_2$ (for example) attempting to forward a packet from the network to the host 902 via the tunnel 1102, i.e., the router $904_2$ (for example) which encapsulated the packet with a new IPL1 header. Once the packet is encapsulated, which includes setting the source address to the router's common IPL1 address, then it must be routed via one of the other adjacent routers $904_1$ (for example) as the direct interface is inoperative. For security reasons, a typical router may not accept a packet with a source address owned by it. However, there are at least two solutions to this problem which can be used by the next hop routers $904_1, 904_2 \ldots 904_n$.

1. A check for a duplicate IP address may be optional as it increases real time processing of the packets received on a particular interface. Given that the interface of interest is between the set of next hop routers and not exposed to external network connections, then this check may be disabled.
2. An Access Control List (ACL), or filter, which will allow receipt of the duplicate source address may be created. This will allow the router to forward the packet to its destination address as normal. The ACL could be applied only on the inter-router link ports which interconnect the adjacent routers participating in the tunneling to the host 900. In this way, no new security holes are opened.

The router $904_2$'s (for example) receipt of a packet and the provisioning of the tunnel in which there is not an operative interface to the host 900 such that the router $904_2$ needs to deliver the packet to an adjacent router $904_1$ (for example) which then needs to deliver the packet to the host 900 is discussed in more detail below with respect to FIGS. 13-14 (case 2).

Host-to-Router Direction

Figure 9:
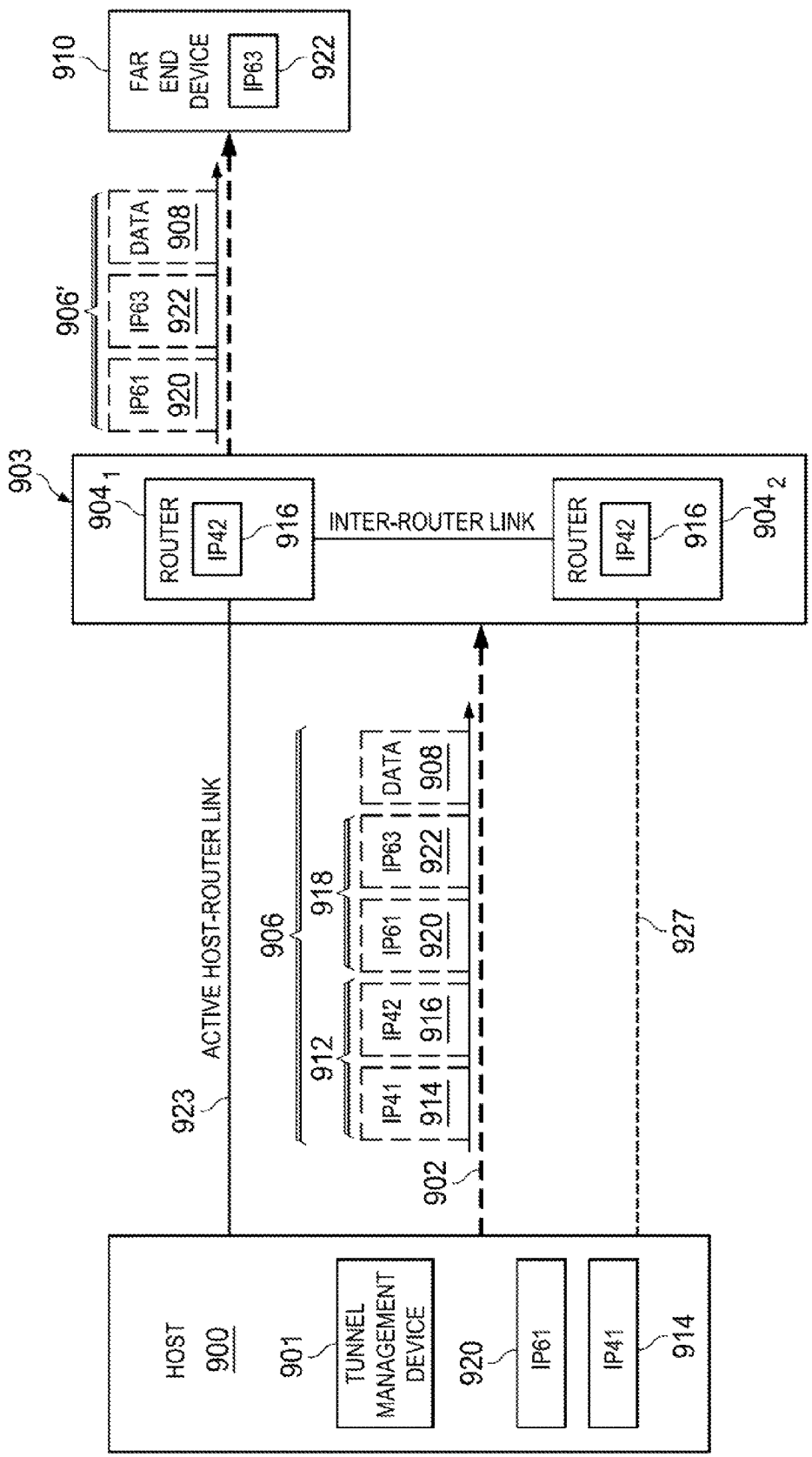
FIG. 9 is a diagram of a host-routers-far end device configuration which is used to explain how a host and next hop routers can implement a virtual tunneling method in accordance with a first embodiment of the present invention.

Referring to FIG. 9, there is an exemplary scenario showing a host 900 provisioning a single tunnel 902 to be used by adjacent routers 904$_1$ and 904$_2$ (only two shown) in accordance with the first embodiment of the present invention. For tunneling, the host 900 has a tunnel management device 901 which creates and is only aware of the single tunnel 902. In other words, the host 900 at the tunneling level is only aware of one "virtual" adjacent router 903 when there are actually any number of actual adjacent routers 904$_1$ and 904$_2$ (only two shown). The host 900 utilizes the single tunnel 902 to send a packet 906 and in particular data 908 located therein to a far end device 910. In this example, the packet 906 includes: (1) a new IP header 912 which contains a source IP address 914 (e.g., the host's tunnel end point IP41) and a destination IP address 916 (e.g., the routers 904$_1$ and 904$_2$'s tunnel end point IP42); (2) an original IP header 918 which contains a source IP address 920 (e.g., the host's IP61) and a destination IP address 922 (e.g., the far end device's IP63); and (3) the data 908 (note: the packet 906' sent from the router to the far end device 910 would not have the new IP header 912). In this example, the original IP header 918 is an IPv6 original IP header 918 and the new IP header 912 is an IPv4 new IP header 912.

In this example, the far end tunnel endpoint (which is effectively the far end tunnel address namely the destination IP address 916 (e.g., IP42)) does not change regardless of which physical path 923 and 927 to anyone of the routers 904$_1$ and 904$_2$ is utilized. The protocols which manage the active link(s) 923 and 927 are independent of the tunnel selection because there is only one virtual tunnel 902. If an active path fails, then the host 900's link management will chose an alternative path. Thus, in the host-to-router direction, upon an active link failure, the host's tunnel management device 901 is unaware of the active link failure and continues to send packets to the virtual tunnel endpoint (e.g., IP42) which is now being served by a router 904$_1$ or 904$_2$ associated with the new active path. According, with the host's tunnel management device 901 the single tunnel 902 will always align with the active path and active router 904$_1$ or 904$_2$. In this example, the host 900 has an active path 923 with router 904$_1$ which means the packet 906 will be sent via the single tunnel 902 to router 904$_1$. If the active path 923 failed, then the host 900 would activate path 927 with router 904$_2$ which means the packet 906 will be sent via the single tunnel 902 to router 904$_2$.

Figure 10:
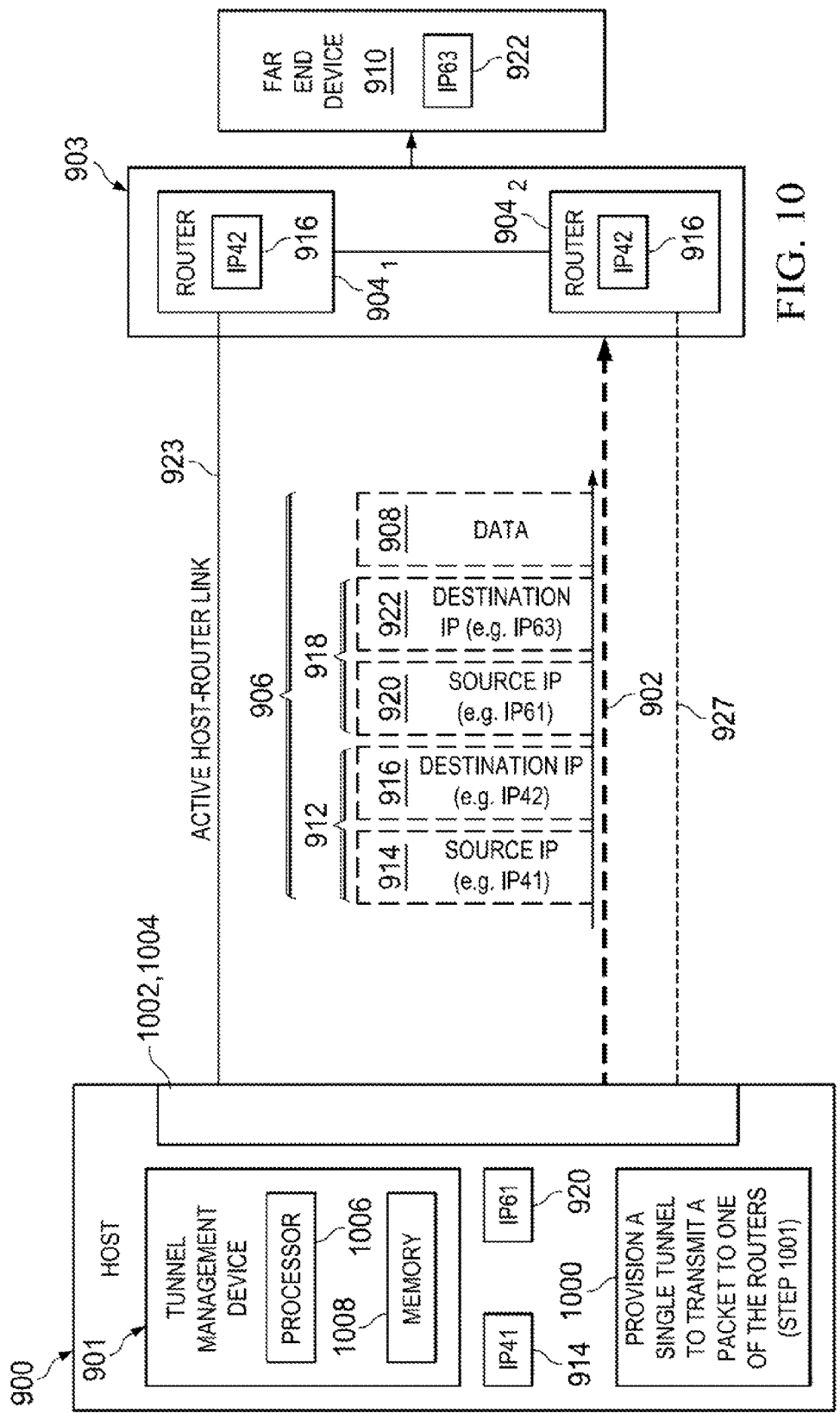
FIG. 10 is a diagram of a host-routers-far end device configuration which is used to explain how the host and next hop routers can implement the virtual tunneling method in accordance with the first embodiment of the present invention.

Referring to FIG. 10, there is a more detailed diagram of the host 900 implementing a virtual tunneling method 1000 to provision the single tunnel 902 to be used by adjacent routers 904$_1$ and 904$_2$ (only two shown) in accordance with the first embodiment of the present invention. As shown, the host 900 includes at least an input interface 1002, an output interface 1004, and a tunnel management device 901 (note: the input interface 1002 and the output interface 1004 can be combined to form an input-output interface). The person skilled in the art will appreciate that the host 900 would include many other well known components but for clarity only the tunnel management device 901 which is needed to explain the present invention has been described in detail herein. In this example, the tunnel management device 901 includes a processor 1006 and a memory 1008 that stores processor-executable instructions where the processor 1006 interfaces with the memory 1008 and executes the processor-executable instructions to perform the virtual tunneling method 1000 by provisioning the single tunnel 902 to transmit the packet 906 from the output interface 1004 to one of the next hop routers 904$_1$ and 904$_2$ (step 1001). The packet 906 is destined for the far end device 910. The single tunnel 902 may terminate at anyone of the next hop routers 904$_1$ and 904$_2$. The single tunnel 902 is configured to transmit the packet 906 which contains the original IP header 918, the new IP header 912 and the payload data 908. The original IP header 918 (which is encapsulated within the new IP header 912) includes: (a) a source IP address 920 indicative of an IP address (e.g., IP61) of the host 902; and (b) a destination IP address 922 indicative of an IP address (e.g., IP63) of the far end device 910. The new IP header 912 includes: (a) a source IP address 914 indicative of a tunnel endpoint IP address (e.g., IP 41) of the host 900; and (b) a destination IP address 916 indicative of a tunnel endpoint IP address (e.g., IP42) for all of the next hop routers 904$_1$ and 904$_2$. As can be appreciated some of the distinguishing features of the virtual tunneling method 1000 is that the single tunnel 902 may terminate at anyone of the next hop routers 904$_1$ and 904$_2$ and that the new IP header 912 includes the destination IP address 916 indicative of a tunnel endpoint IP address (e.g., IP42) for all of the next hop routers 904$_1$ and 904$_2$. The tunnel endpoint IP address (e.g., IP42) for all of the next hop routers 904$_1$ and 904$_2$ is known only by the host 900 and the next hop routers 904$_1$ and 904$_2$. The virtual tunneling method 1000 offers the following advantages (for example): (1) simplicity; (2) less provisioning—a single tunnel 902 is established at the host 902; (3) independence between tunnel management and link management; (4) efficient routing via automatic synchronization of the active tunnel and the active link; and (5) not dependent upon a tunnel integrity verification.

Router-to-Host Direction

As discussed above, the router-to-host traffic flow direction will utilize the original IP header's destination address to route a packet 925 originated by the far end device 910 to the host 900. In this situation, there are two cases to consider which are as follows:

Case 1: The packet 925 arrives at the adjacent router 904$_1$ (for example) which has a direct active link 923 to the host 900 (see FIGS. 11 and 12)

Case 2: The packet 925 arrives at an adjacent router 904$_2$ (for example) with a direct inactive link 927 to the host 900 (see FIGS. 13-14).

Figure 11:
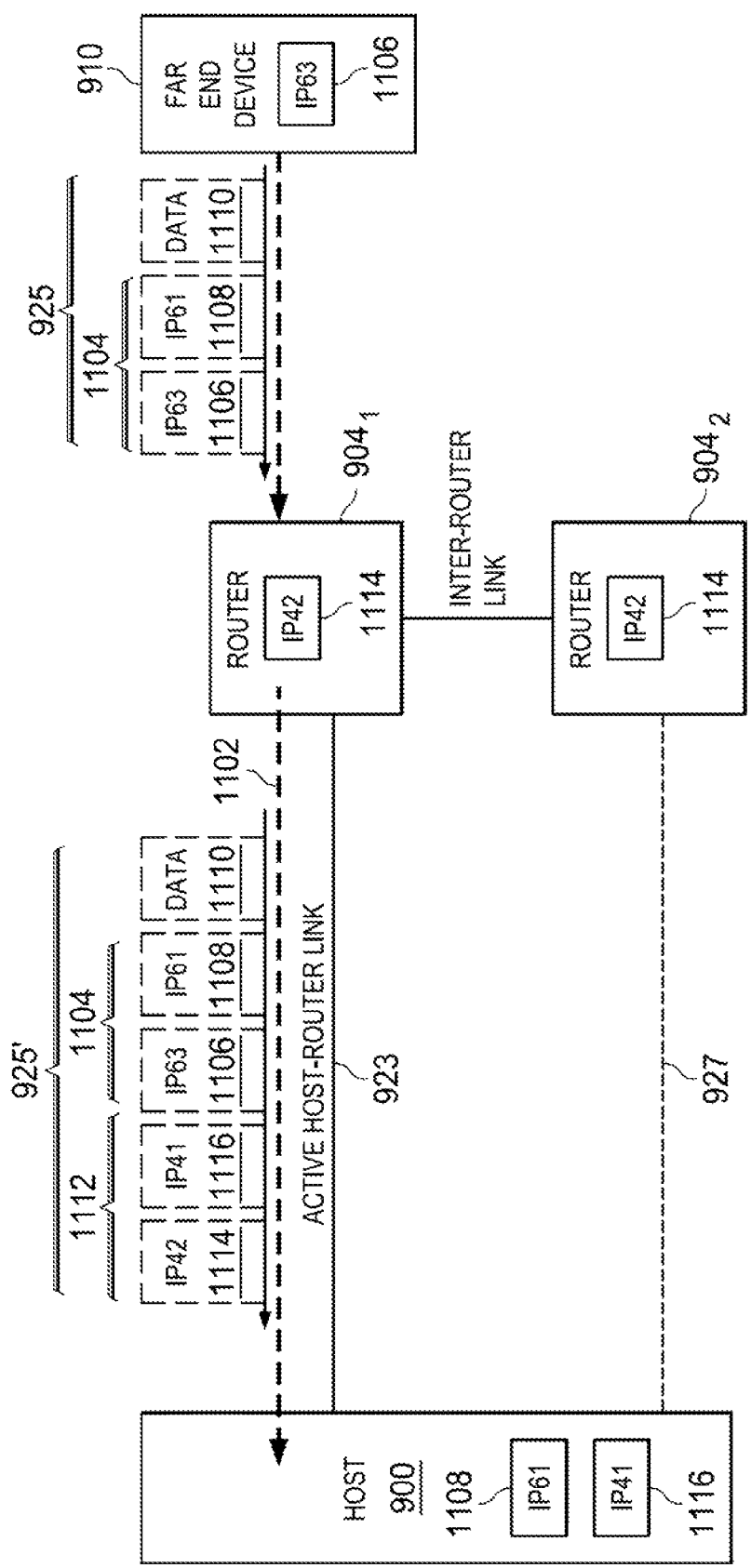
FIG. 11 is a diagram of a host-routers-far end device configuration which is used to explain how the host and next hop routers can implement the virtual tunneling method in accordance with the first embodiment of the present invention.

Referring to FIG. 11, there is an exemplary scenario per case 1 showing a router 904$_1$ provisioning a single tunnel 1102 to forward the packet 925 originated by the far end device 910 and destined for the host 900 in accordance with the first embodiment of the present invention. The router 904$_1$ encapsulates the original incoming packet 925 with a tunnel header 1112 (new IP header 1112) and forwards the encapsulated packet 925' directly to the host 900 over the direct active link 923. The encapsulated packet's source IPL1 (the router 904$_1$'s tunnel end point address 1114 (e.g., IP42)) is the virtual router tunnel IP address as expected by the host 900. More specifically, the router 904$_1$ receives the packet 925 from the far end device 910 and provisions the tunnel 1102 to transmit the packet 925' on the direct active link 923 to the host 900. The packet 925 includes: (1) an original IP header 1104 which contains a source IP address 1106 (e.g., the far end device's IP63) and a destination IP address 1108 (e.g., the host's IP61); and (2) data 1110. The packet 925' includes: (1) the original IP header 1104 which contains the source IP address 1106 (e.g., the far end device's IP63) and a destination IP address 1108 (e.g., the host's IP61); (2) the new IP header 1112 which encapsulates the original IP header 1104 and contains a source IP address 1114 (e.g., the routers 904$_1$ and 904$_2$'s tunnel end point IP42) and a destination IP address 1116 (e.g., the host's tunnel end point IP41); and (3) the data 1110. In this example, the original IP header 1104 is an IPv6 original IP header 1104 and the new IP header 1112 is an IPv4 new IP header 1112. Note: this flow pattern is the same for all active host-router links, i.e., a packet arriving at any of the routers with an active link will tunnel the packet directly over that active link to the host 900.

Figure 12:
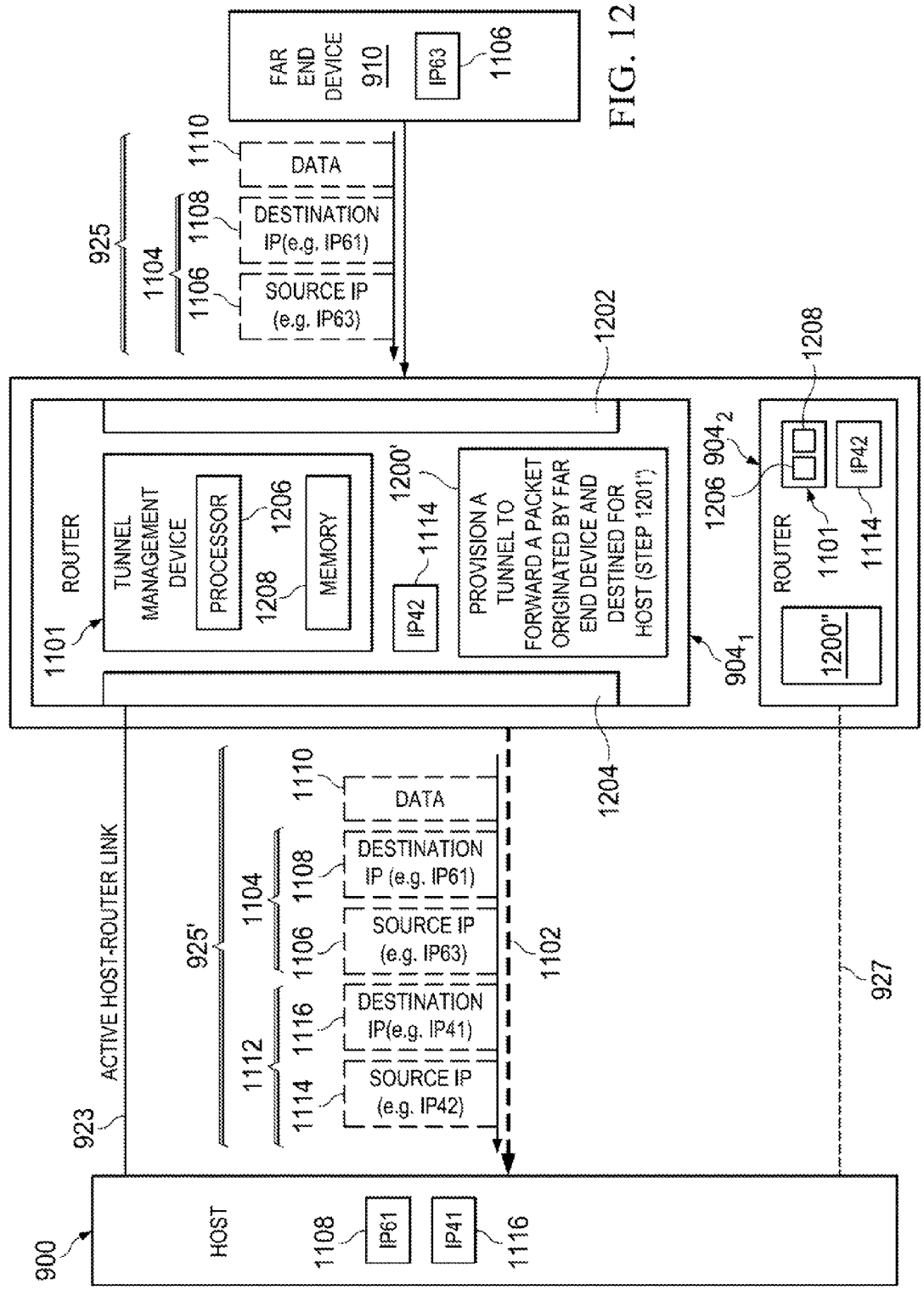
FIG. 12 is a diagram of a host-routers-far end device configuration which is used to explain how the host and next hop routers can implement the virtual tunneling method in accordance with the first embodiment of the present invention.

Referring to FIG. 12, there is a more detailed diagram of the next hop router 904$_1$ implementing a virtual tunneling method 1200' to provision the single tunnel 1102 to forward the packet 925 originated by the far end device 910 and destined for the host 900 in accordance with the first embodiment of the present invention. As shown, the next hop router 904$_1$ includes at least an input interface 1202, an output interface 1204, and a tunnel management device 1101 (note: the input interface 1202 and the output interface 1204 can be combined to form an input-output interface). The person skilled in the art will appreciate that the router 904$_1$ would include many other well known components but for clarity only the tunnel management device 1101 which is needed to explain the present invention has been described in detail herein. In this example, the tunnel management device 1101 includes a processor 1206 and a memory 1208 that stores processor-executable instructions where the processor 1206 interfaces with the memory 1208 and executes the processor-executable instructions to perform the virtual tunneling method 1200' by provisioning the single tunnel 1102 to forward the packet 925 originated by the far end device 910 and destined for the host 900 (step 1201'). The tunnel 1102 is configured to transmit the packet 925' which contains an original Internet Protocol (IP) header 1104 which is encapsulated within a new IP header 1112. Plus, the packet 925' contains the data 1110. The original IP header 1104 comprises: (1) a source IP address 1106 indicative of an IP address (e.g., IP63) of the far end device 910; and (2) a destination IP address 1108 indicative of an IP address (e.g., IP61) of the host 900. The new IP header 1112 comprises: (1) a source IP address 1114 indicative of a tunnel endpoint IP address (e.g., IP42) for the router 904$_1$ and the other next hop routers 904$_2$ (only one shown); and (2) a destination IP address 1116 indicative of a tunnel endpoint IP address (e.g., IP41) for the host 900. In this case, since there is an active link 923 between the router 904$_1$ and the host 900 then the router 904$_1$ forwards the packet 925' using the provisioned tunnel 1102 directly on the active link 923 to the host 900. As can be appreciated some of the distinguishing features of the virtual tunneling method 1200' is that the new IP header 1112 includes the source IP address 1114 indicative of a tunnel endpoint IP address (e.g., IP42) for the router 904$_1$ and the other next hop routers 904$_2$ (only one shown). The tunnel endpoint IP address (e.g., IP42) for the router 904$_1$ and the other next hop routers 904$_2$ (only one shown) is known only by the host 900 and the next hop routers 904$_1$ and 904$_2$.

Referring to FIG. 13, there is an exemplary scenario per case 2 showing a router 904$_2$ provisioning a single tunnel 1302 to forward the packet 925 originated by the far end device 910 and destined for the host 900 in accordance with the first embodiment of the present invention. In this case, the original packet 925 arrives at the adjacent router 904$_2$ which has an inactive link 927 to the host 900. The link 927 could be inactive due to a link failure or due to routing control. It is assumed that the network could not deliver the packet 925 over the more efficient path to the router 904$_1$ which does have a direct active path 923 to the host 900 due to a broken path between the network and that router 904$_2$ or a slow routing update. In this situation, the router 904$_2$ encapsulates the original incoming packet 925 with the tunnel header 1112 (new IP header 1112) and forwards the encapsulated packet 925' based on the newly created IPL1 source address (the router 904$_2$'s tunnel end point address 1114 (e.g., IP42)). The router 904$_2$ does not have a direct active path to the host 900 however it does have an alternative path to the host 900 via an inter-router link 931 to one of the other adjacent routers 904$_1$. Thus, the router 904$_2$ assuming routing algorithms are in place therein forwards the packet 925' on tunnel 1302 to another adjacent router 904$_1$ in order to reach the host 900. In this example, the new adjacent router 904$_1$ happens to have the direct path 923 to the host 900 and thus routes the packet 925' directly to the host 900. In the event, router 904$_1$ did not have a direct path to the host 900 then that router 904$_1$ would forward the packet 925' to yet another adjacent router (not shown) and so on until one of the adjacent routers which has a direct path to the host 900 receives the packet 925' and forwards the packet 925' on the direct path to the host 900. As mentioned above, the new adjacent router 904$_k$ must allow this packet 925' to be forwarded even though this packet's source address 1114 (the router 904$_2$'s tunnel end point address 1114 (e.g., IP42)) matches the internal-private tunnel endpoint address of 904$_1$. For instance, the router 904$_1$ can be configured to accomplish this as discussed above using an ACL defined for the inter-router link ports.

Referring to FIG. 14, there is a more detailed diagram of the next hop router 904$_2$ implementing a virtual tunneling method 1200" to provision the single tunnel 1302 to forward the packet 925 originated by the far end device 910 and destined for the host 900 in accordance with the first embodiment of the present invention. As shown, the router 904$_2$ includes at least an input interface 1202, an output interface 1204, and a tunnel management device 1101 (note: the input interface 1202 and the output interface 1204 can be combined to form an input-output interface). The person skilled in the art will appreciate that the router 904$_2$ would include many other well known components but for clarity only the tunnel management device 1101 which is needed to explain the present invention has been described in detail herein. In this example, the tunnel management device 1101 includes a processor 1206 and a memory 1208 that stores processor-executable instructions where the processor 1206 interfaces with the memory 1208 and executes the processor-executable instructions to perform the virtual tunneling method 1200" by provisioning the single tunnel 1302 to forward the packet 925 originated by the far end device 910 and destined for the host 900 (step 1201"). The tunnel 1302 is configured to transmit the packet 925' which contains an original Internet Protocol (IP) header 1104 which is encapsulated within a new IP header 1112. Plus, the packet 925' contains the data 1110. The original IP header 1104 comprises: (1) a source IP address 1106 indicative of an IP address (e.g., IP63) of the far end device 910; and (2) a destination IP address 1106 indicative of an IP address (e.g., IP61) of the host 900. The new IP header 1112 comprises: (1) a source IP address 1114 indicative of a tunnel endpoint IP address (e.g., IP42) for the router 904$_2$ and the other next hop routers 904$_1$ (only one shown); and (2) a destination IP address 1116 indicative of a tunnel endpoint IP address (e.g., IP41) for the host 900. In this case, since there is not an active link between the router 904$_2$ and the host 900 then the packet 925' is forwarded by the provisioned tunnel 1302 to another next hop router 904$_1$ in order to reach the host 900. As can be appreciated some of the distinguishing features of the virtual tunneling method 1200" is that the new IP header 1112 includes the source IP address 1114 indicative of a tunnel endpoint IP address (e.g., IP42) for the next hop routers 904$_1$ and 904$_2$ (only two shown). The tunnel endpoint IP address (e.g., IP42) for the next hop routers 904$_1$ and 904$_2$ (only two shown) is known only by the host 900 and the next hop routers 904$_1$ and 904$_2$. Plus, the next hop router 904$_1$ which receives the packet 925' from router 904₂ has to allow the packet 925' to be forwarded therefrom directly towards the host 900 or toward another next hop router (not shown) even though the new IP header's source IP address 1114 (the router 904₁'s tunnel end point address 1114 (e.g., IP42)) in the received packet 925' matches the tunnel endpoint address (e.g., IP42) of router 904₁.

Second Embodiment

Multiple Tunnel Management

Referring to FIGS. 15-21, there are several drawings used to help explain the features and steps of the multiple tunnel management method 1500 which is implemented by the host 1502 in accordance with a second embodiment of the present invention. To explain how the host 1502 implements the multiple tunnel management method 1500 a basic description about several exemplary scenarios is provided below first with respect to FIGS. 15-20 and then a more detailed discussion about how the host 1502 can implement the multiple tunnel management method 1500 is described with respect to FIGS. 21A-21E. As will be described in detail below, the multiple tunnel management method 1500 can be used when the host 1502 has multiple tunnels 1514 and 1516 with multiple adjacent routers 1504₁ and 1504₂ (only two shown) and the multiple tunnel management method 1500 basically functions to: (1) inform the host 1502 as to which tunnel aligns with which active link; and to (2) inform the host on the location of a fault if one occurs.

In the case where multiple tunnels 1514 and 1516 are run between the host 1502 and its next hop routers 1504₁ and 1504₂ (only two shown—in most of the figures), the host 1502 has a tunnel management mechanism 1503 which implements the multiple tunnel management method 1500 to determine the optimized path based on the active paths available without having to interface with the lower layer protocols. The host's tunnel management mechanism 1503 also has a heartbeat mechanism 1505 that is used to check the integrity of the tunnels 1514 and 1516 to the next hop routers 1504₁ and 1504₂. The heartbeat mechanism 1505 can be based on any appropriate protocol which can operate over tunnels including (for example): (1) Bidirectional Forwarding Detection (BFD); (2) Internet Control Message Protocol (ICMP); and (3) Network Unreachability Detection (NUD).

Figure 17:
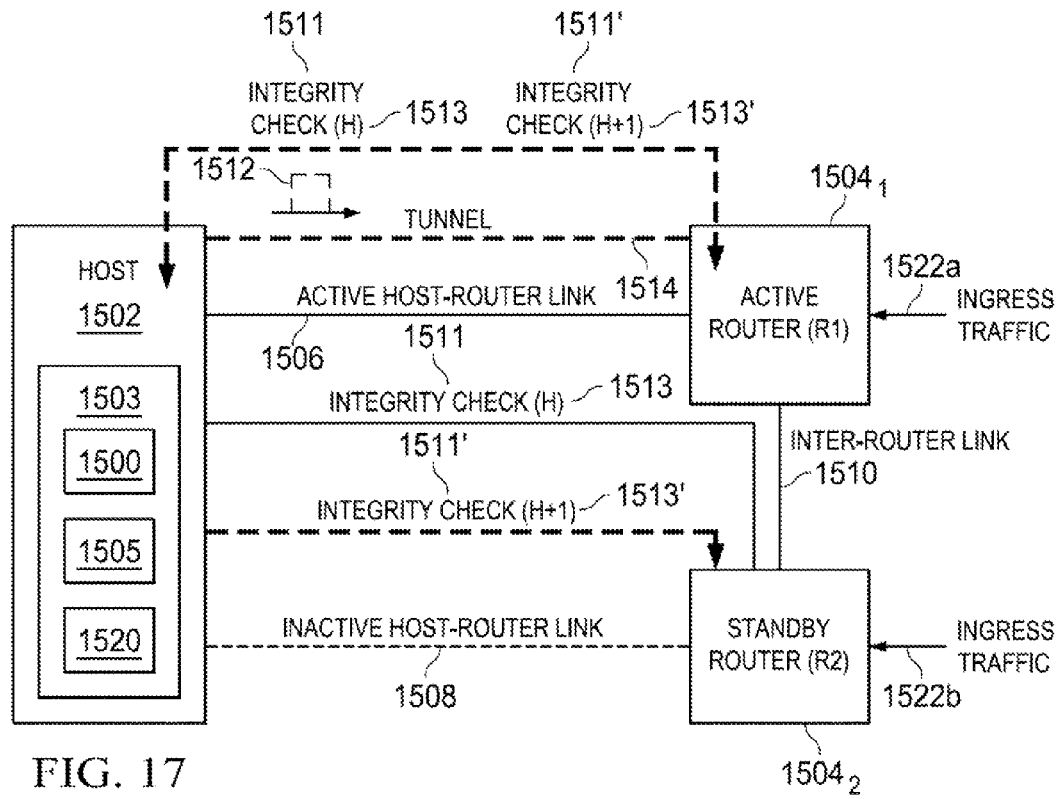
FIG. 17 is a diagram of a host-routers configuration which is used to explain how the host can implement the multiple tunnel management method in accordance with the second embodiment of the present invention.

The host 1502 implements the multiple tunnel management method 1500 by sending integrity checks 1511 to each tunnel end point while the IPv4 header Time To Live (TTL) field or the IPv6 header Hop Limit 1513 in those integrity checks 1511 are set specifically in order to determine which next hop router 1504₁ is associated with the active tunnel 1516 (see FIG. 17). Note: that in the case of tunneling, the TTL/Hop Limit that is decremented at each hop is the one in IPL1 (recall: IPL1 address are used in the outside IP header to route between the host-router while IPL2 addresses are used in the original IP header to route between the host-far end device). The term "Hop Limit" will be used generically herein to represent both IPv4 and IPv6. Furthermore, the following terms are used herein to help explain how the host 1502 can implement the multiple tunnel management method 1500 in accordance with the second embodiment of the present invention:

Active Link: The preferred and in-use physical path between the host and one of its next hop routers (adjacent routers).
Active Next Hop Router: The next hop router associated with the active link.
Active Tunnel: The tunnel between the host and the active next hop router.
H: Represents the number of hops from the host process to the active next hop router.
Hop Limit: IPv4 TTL or IPv6 Hop Limit.
Standby Router: The host's other next hop router(s) that do not have an active link between them and the host (per the host's perspective).

The following discussion explains in detail how the host 1502 implements the multiple tunnel management method 1500 in accordance with the second embodiment of the present invention.

Figure 15:
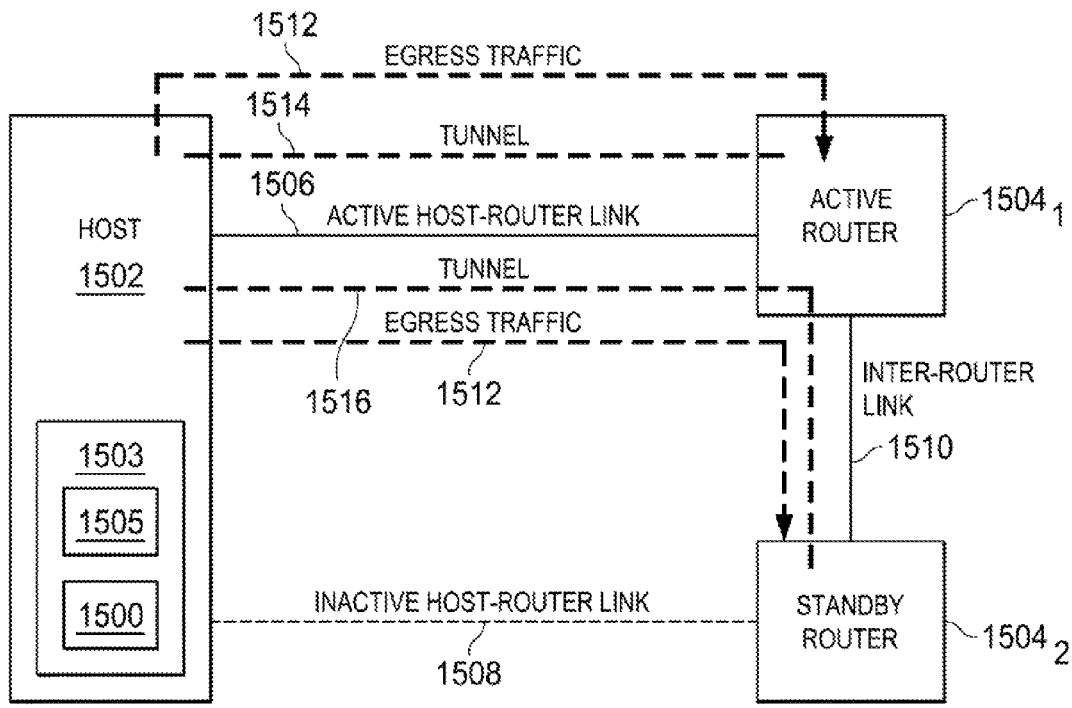
FIG. 15 is a diagram of a host-routers configuration which is used to explain how a host can implement a multiple tunnel management method in accordance with a second embodiment of the present invention.

Referring to FIG. 15, there is a basic diagram of the host 1502 connected to the active next hop router 1504₁ and the standby next hop router 1504₂ which is used to explain the normal traffic flow when there is a single active host-router link 1506. In this situation, there is one active link 1506 between the host 1502 and the active next hop router 1504₁, and one inactive link 1508 (only one shown) between the host 1502 and the standby next hop router 1504₂ (only one shown). The active router 1504₁ and a standby next hop router 1504₂ are connected to one another by one or more inter-router links 1510 (one shown). In this scenario, the normal flow of traffic 1512 is from the host 1502 to the router 1504₁ which is associated with the active link 1506. If the traffic 1512 cannot be routed directly from the active router 1504₁ to the network (far end device), or if the traffic 1512 is destined to a standby next hop router 1504₂, then the traffic 1512 will be relayed on the inter-router link 1510 from the active router 1504₁ to the standby next hop router 1504₂.

Figure 16:
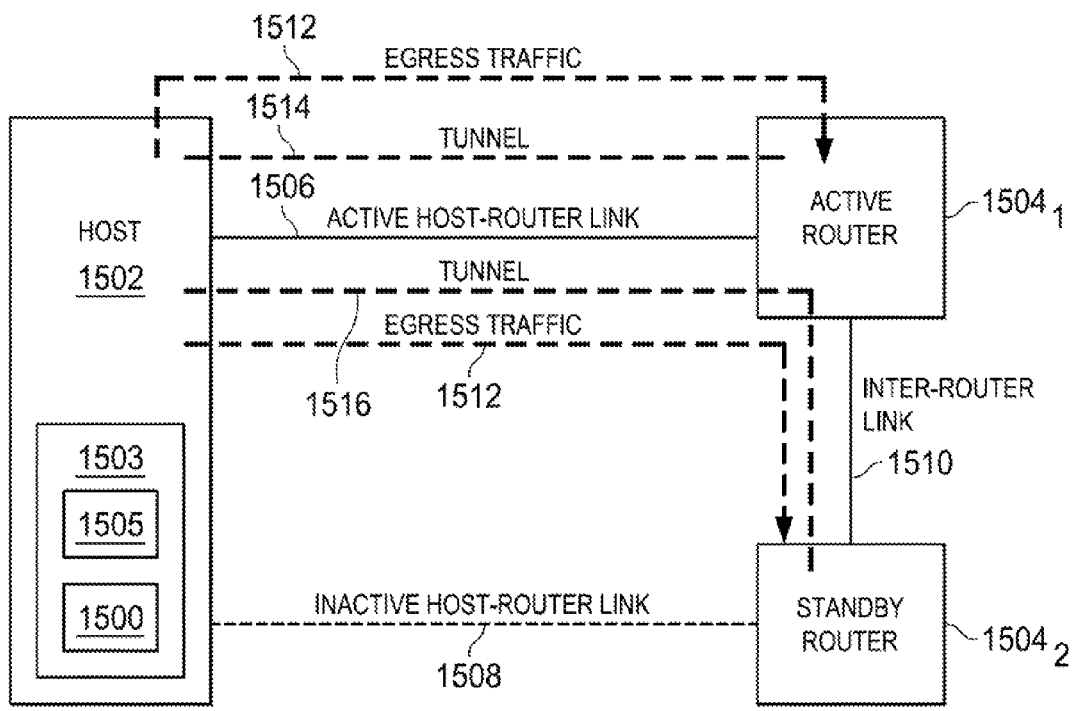
FIG. 16 is a diagram of a host-routers configuration which is used to explain how the host can implement the multiple tunnel management method in accordance with the second embodiment of the present invention.

Referring to FIG. 16, there is a basic diagram of the host 1502 connected to the active next hop router 1504₁ and the standby next hop router 1504₂ which is used to explain the tunnel flow when there is a single active host-router link 1506. In this example, the host 1502 has a tunnel 1514 with the active next hop router 1504₁, and the host 1502 has another tunnel 1516 with the standby next hop router 1504₂. As in FIG. 15, the normal flow of traffic 1512 using tunnel 1514 is from the host 1502 to the router 1504₁ which is associated with the active link 1506. If the traffic 1512 cannot be routed directly from the active router 1504₁ to the network (far end device), or if the traffic 1512 is destined to a standby next hop router 1504₂, then the traffic 1512 will be relayed on the inter-router link 1510 using the tunnel 1516 from the host 1502 to the standby next hop router 1504₂ via the active router 1504₁. Note: that with no faults in the system, all tunnels 1514 and 1516 are operational however the tunnel 1514 associated with the active router 1504₁ requires the fewest hops and is therefore the most efficient.

Referring to FIG. 17, there is a basic diagram of the host 1502 connected to the active next hop router 1504₁ and the standby next hop router 1504₂ which is used to explain the use of the integrity checks 1511 in the multiple tunnel management method 1500. The host 1502 sets the hop limit 1513 of the integrity check 1511 to "H", so that only the active router 1504₁ will process its intended integrity check 1511. The integrity checks 1511 destined for other routers 1504₂ will be dropped by the active router 1504₁ as the hop limit 1513 has been exceeded. This implies that only the integrity check 1511 associated with the active router 1504₁, and hence the active tunnel 1514, will be successful. While, the integrity checks 1511 to the inactive router(s) 1504₂ will not be successful. The host 1502 is now aware of the active router 1504₁ and can establish an active tunnel 1514. Note: that the integrity check-hop limit process described is only applied to the integrity check and not any other traffic. As such, the normal traffic 1512 would utilize whatever existing hop limit has already been predetermined as appropriate.

The host 1502 maintains a table 1520 (router/tunnel map 1520) showing the status of each integrity check 1511. Under normal conditions, only one integrity check 1511 will succeed. In the exemplary table 1520 below, R1 is the active router 1504$_1$ as indicated by the "✓" in the "Hop Limit=H" column. The host 1502 may optionally run separate integrity checks 1511' with "Hop Limit=H+1" 1513' to each router 1504$_1$, 1504$_2$, 1504$_3$ ... 1504$_n$ (R1, R2, R3 ... Rn) in parallel or just switch back and forth between H and H+1 depending on the Router/Tunnel map data. Under normal conditions, all next hop routers 1504$_1$, 1504$_2$, 1504$_3$ ... 1504$_n$ (R1, R2, R3 ... Rn) should be reached with Hop Limit=H+1, as is shown in TABLE #1 below.

TABLE #1

Router/Tunnel Map 1520 under Normal Conditions

| Router/Tunnel | Hop Limit = H | Hop Limit = H + 1 |
|---|---|---|
| R1 | ✓ | ✓ |
| R2 | X | ✓ |
| R3 | X | ✓ |
| . | . | . |
| . | . | . |
| . | . | . |
| Rn | X | ✓ |

✓ Successful Integrity Check
X Unsuccessful Integrity Check

The ingress traffic 1522a and 1522b destined for the host 1502, under normal conditions will be encapsulated by the respective next hop routers 1504$_1$ and 1504$_2$ routed to the IPL1 destination address (i.e., host's destination address) as discussed in detail in the TABLE #2 below.

TABLE #2

Ingress Traffic Behavior under Normal Conditions

| Case | Router | Behavior |
|---|---|---|
| N/A | R1 | The arriving packet 1522a at R1 1504$_1$ includes the host's destination address (DA). R1's routing table will link the host's DA to its tunnel. The packet 1522a will be enveloped and routed directly to the host's IPL1 DA. |
|  | R2 | The arriving packet 1522b at R2 1504$_2$ includes the host's DA. R2's routing table will link the host's DA to its tunnel. The packet 1522b will be enveloped and routed. From R2's perspective, the path between R2 1504$_2$ and the host 1502 may be routable even though the host 1502 uses it as a standby path. In this case, R2 1504$_2$ will route directly to the host 1502. If this path is treated as a standby path, i.e., less preferred, then R2 1504$_2$ will route the packet 1522b via R1 1504$_1$ which in turn routes the packet 1522b to the host 1502. Either process is acceptable. |

There are several failure scenarios that are considered next including: (1) link failure; (2) router failure; and (3) tunnel failure.

Link Failure

If a failure occurs between the host 1502 and the active router 1504$_1$, then the host 1502, as normal, will chose an alternative path implying that the active physical link changes. When this occurs, the router/tunnel map 1520 will alter. For example, if the new active link is between the host 1502 and next hop router 1504$_2$ (R2), then the router/tunnel map 1520 will appear as shown in TABLE #3.

TABLE #3

Router/Tunnel Map 1520 after Link Failure

| Router/Tunnel | Hop Limit = H | Hop Limit = H + 1 |
|---|---|---|
| R1 | X | ✓ |
| R2 | ✓ | ✓ |
| R3 | X | ✓ |
| . | . | . |
| . | . | . |
| . | . | . |
| Rn | X | ✓ |

✓ Successful Integrity Check
X Unsuccessful Integrity Check

Figure 18A:
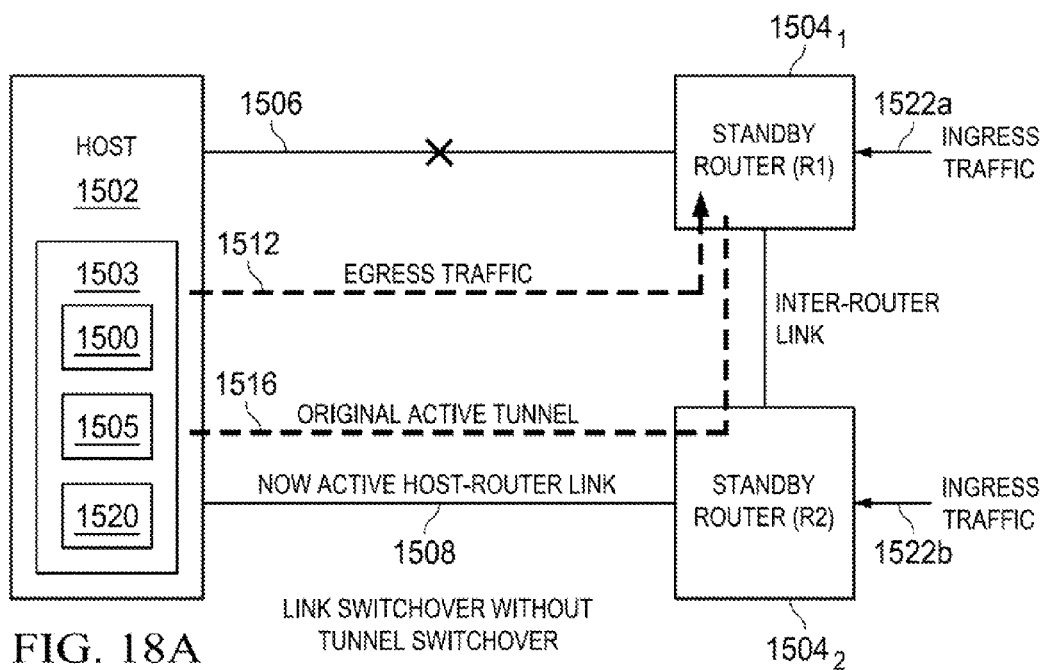
FIG. 18A is a diagram of a host-routers configuration which is used to explain how the host can implement the multiple tunnel management method in accordance with the second embodiment of the present invention.
Figure 18B:
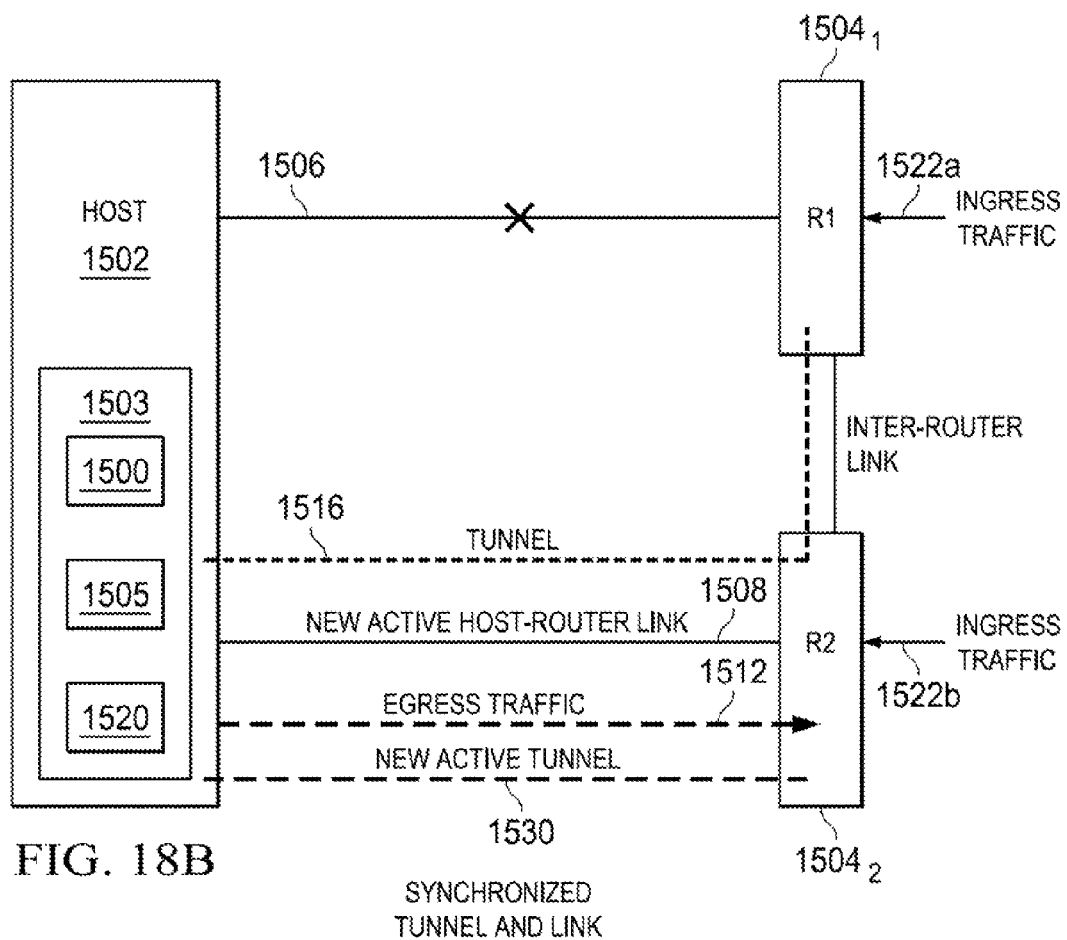
FIG. 18B is a diagram of a host-routers configuration which is used to explain how the host can implement the multiple tunnel management method in accordance with the second embodiment of the present invention.

At this moment in time, the host 1502 may choose to alter the active tunnel to that associated with router 1504$_2$ (R2) in order to gain the most efficient routing and avoid an unnecessary hop to router 1504$_1$ (R1) via router 1504$_2$ (R2). FIGS. 18A-18B illustrate a scenario on how the host 1502 alters the active tunnel during a link failure (e.g., former active host-router link 1506). In FIG. 18A, the active link has switched over to host-router link 1508 due to a failure of the previous active host-router link 1506 while the original tunnel 1516 continues to terminate at router 1504$_1$ (R1). Tunnel traffic 1512 is successful but inefficient. In FIG. 18B, the host 1502 recognizes this condition based on the router/tunnel map 1520 and switches to an active tunnel 1530 associated with router 1504$_2$ (R2).

The routers 1504$_1$ and 1504$_2$ (R1 and R2) handling of ingress traffic 1522a and 1522b destined for the host 1502 under link failure conditions is discussed in detail in the TABLE #4 below.

TABLE 4

Ingress Traffic 1522a and 1522b Behavior under Link Failure

| Case | Router | Behavior |
|---|---|---|
| A & B | R1 | The arriving packet 1522a at R1 1504$_1$ includes the Host's Destination Address (DA). R1's routing table will link the Host's DA to its tunnel. The packet 1522a will be enveloped and routed to the host 1502 via R2 1504$_2$ using the host's IPL1 DA. R2 1504$_2$ will route the packet 1522a to IPL1 DA directly to the host 1502. |
|  | R2 | The arriving packet 1522b at R2 1504$_2$ includes the Host's DA. R2's routing table will link the Host's DA to its tunnel. The packet 1522b will be enveloped and routed directly to the host 1502. |

When the link 1506 recovers, if the host 1502 does not revert back to that link 1506, then nothing changes with respect to the integrity checks 1511 and 1511' and the router/tunnel map 1520 in TABLE #3 above. If the host 1502 does revert back to that link 1506, then from the perspective of the tunnel management device 1503, it will appear as a link failure and the same process described in this section will take place moving the active tunnel back to the original path.

Router Failure

Figure 19A:
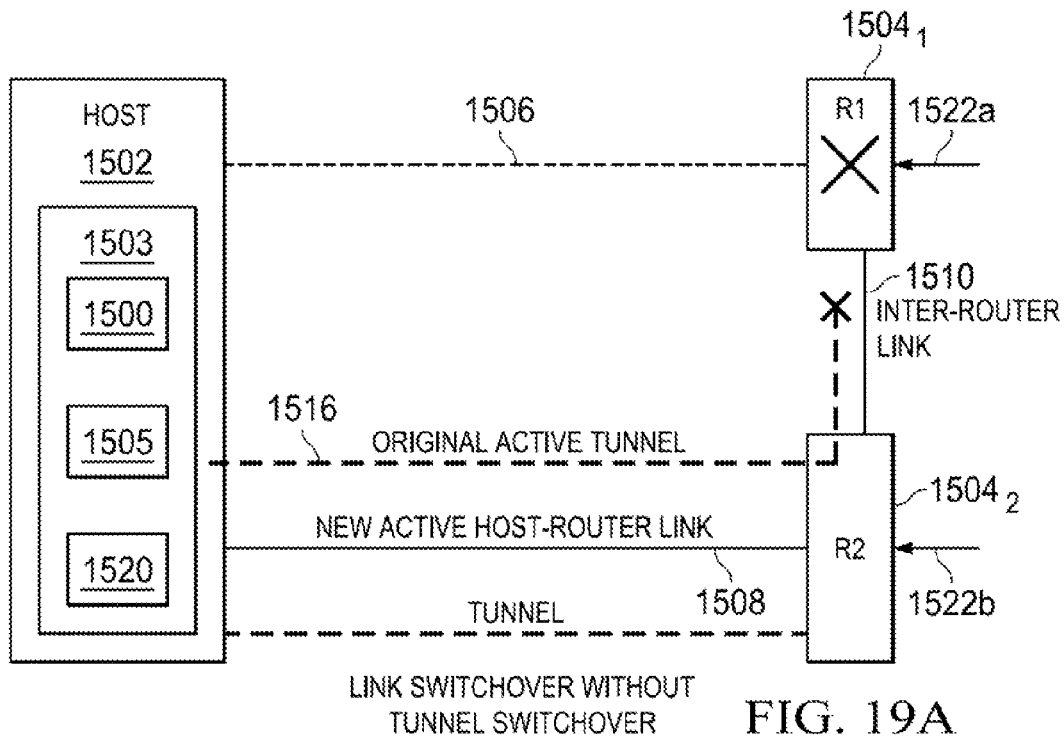
FIG. 19A is a diagram of a host-routers configuration which is used to explain how the host can implement the multiple tunnel management method in accordance with the second embodiment of the present invention.
Figure 19B:
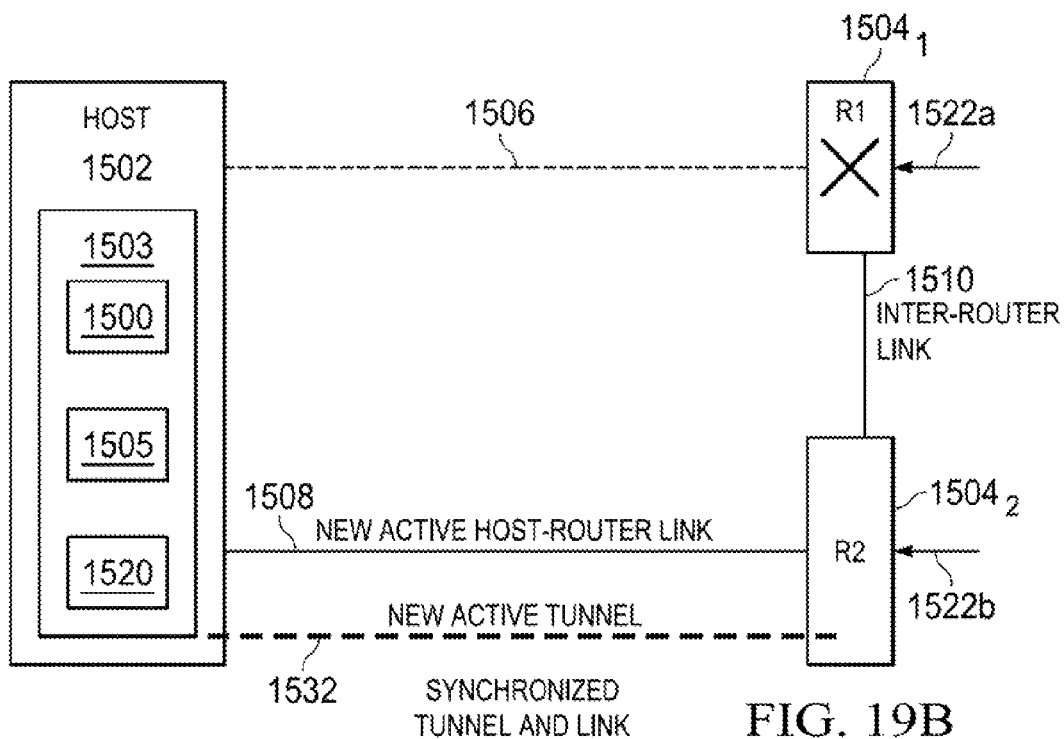
FIG. 19B is a diagram of a host-routers configuration which is used to explain how the host can implement the multiple tunnel management method in accordance with the second embodiment of the present invention.

Referring to FIGS. 19A-19B, there are basic diagrams of the host 1502 connected to the failed router 1504$_1$ (R1) and the standby router 1504$_2$ (R2) which are used to explain the tunnel selection after a router failure. If the active router 1504$_1$ (R1) fails, then the host 1502, as normal, will chose an alternative path implying that the active physical link changes (FIG. 19A—shows the link switchover from link 1506 to link 1508 without tunnel switchover). When this occurs, the host's router/tunnel map 1520 will alter after performing the integrity check 1511 and 1511'. For example, if link 1508 is the new active link between the host 1502 and router 1504$_2$ (R2), then the router/tunnel map 1520 will appear after the integrity check 1511 and 1511' with hop limit H and hop limit H+1 as shown in TABLE #5 below. In addition, the integrity check 1511' with the hop limit of H+1 also shows a failure with R1. Hence, the router/tunnel map 1520 indicates a problem with router 1504$_1$ (R1)

TABLE #5

Router/Tunnel Map 1520 after Router Failure

| Router/Tunnel | Hop Limit = H | Hop Limit = H + 1 |
|---|---|---|
| R1 | X | X |
| R2 | ✓ | ✓ |
| R3 | X | ✓ |
| . | . | . |
| . | . | . |
| . | . | . |
| Rn | X | ✓ |

✓ Successful Integrity Check
X Unsuccessful Integrity Check

The primary difference between the Router failure from the Link failure as described above is that packet loss is occurring given that the current tunnel terminates at the failed router 1504$_1$ (R1). With the failed router 1504$_1$ (R1), the host 1502 must switch to the tunnel 1532 associated with a new active router 1504$_2$ (R2) in order to maintain traffic flow (see FIG. 19B—shows synchronized new activated tunnel 1532 and link 1508).

The routers 1504$_1$ and 1504$_2$ (R1 and R2) handling of ingress traffic 1522a and 1522b destined for the host 1502 under router failure condition is discussed in detail in the TABLE #6 below.

TABLE 6

Ingress Traffic 1522a and 1522b Behavior under Router Failure

| Case | Router | Behavior |
|---|---|---|
| A & B | R1 | NA |
| | R2 | The arriving packet 1522b at R2 1504$_2$ includes the host's DA. R2's routing table will link the host's DA to its tunnel. The packet 1522b will be enveloped and routed directly to the host 1502. |

When the router 1504$_1$ (R1) recovers, if the host 1502 does not revert back to that associated link 1506, then nothing changes with respect to the router/tunnel map 1520 in TABLE #5 after performing integrity checks 1511 and 1511' with the exception that H+1 will show success for router 1504$_1$ (R1). If the host 1502 does revert back to that link 1506, then from perspective of the tunnel management device 1503, it will appear as a link failure and the same process described in the previous section associated with a link failure will take place moving the active tunnel back to the original path.

Tunnel Failure (without Router Failure)

Figure 20A:
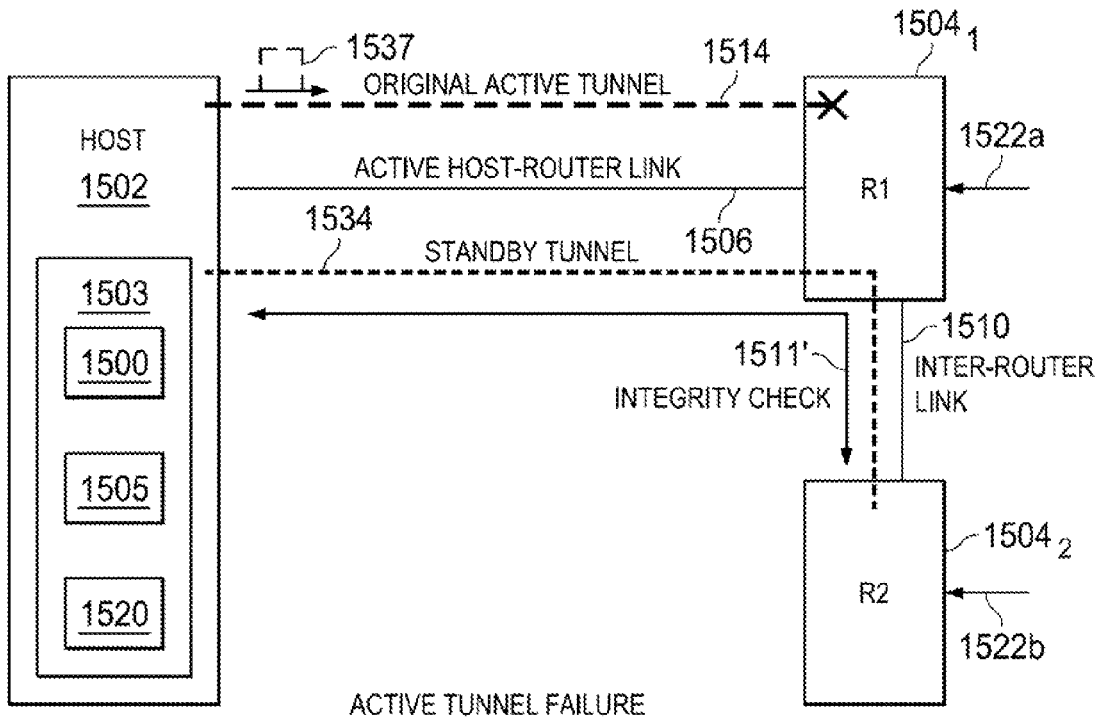
FIG. 20A is a diagram of a host-routers configuration which is used to explain how the host can implement the multiple tunnel management method in accordance with the second embodiment of the present invention.
Figure 20B:
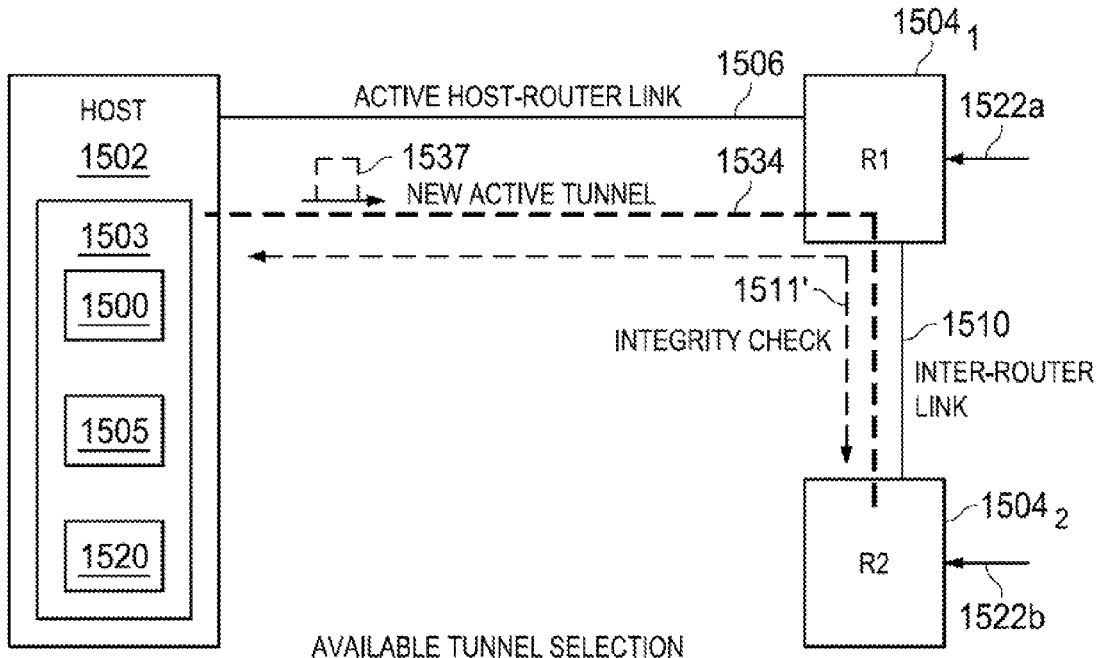
FIG. 20B is a diagram of a host-routers configuration which is used to explain how the host can implement the multiple tunnel management method in accordance with the second embodiment of the present invention.
Figure 21A:
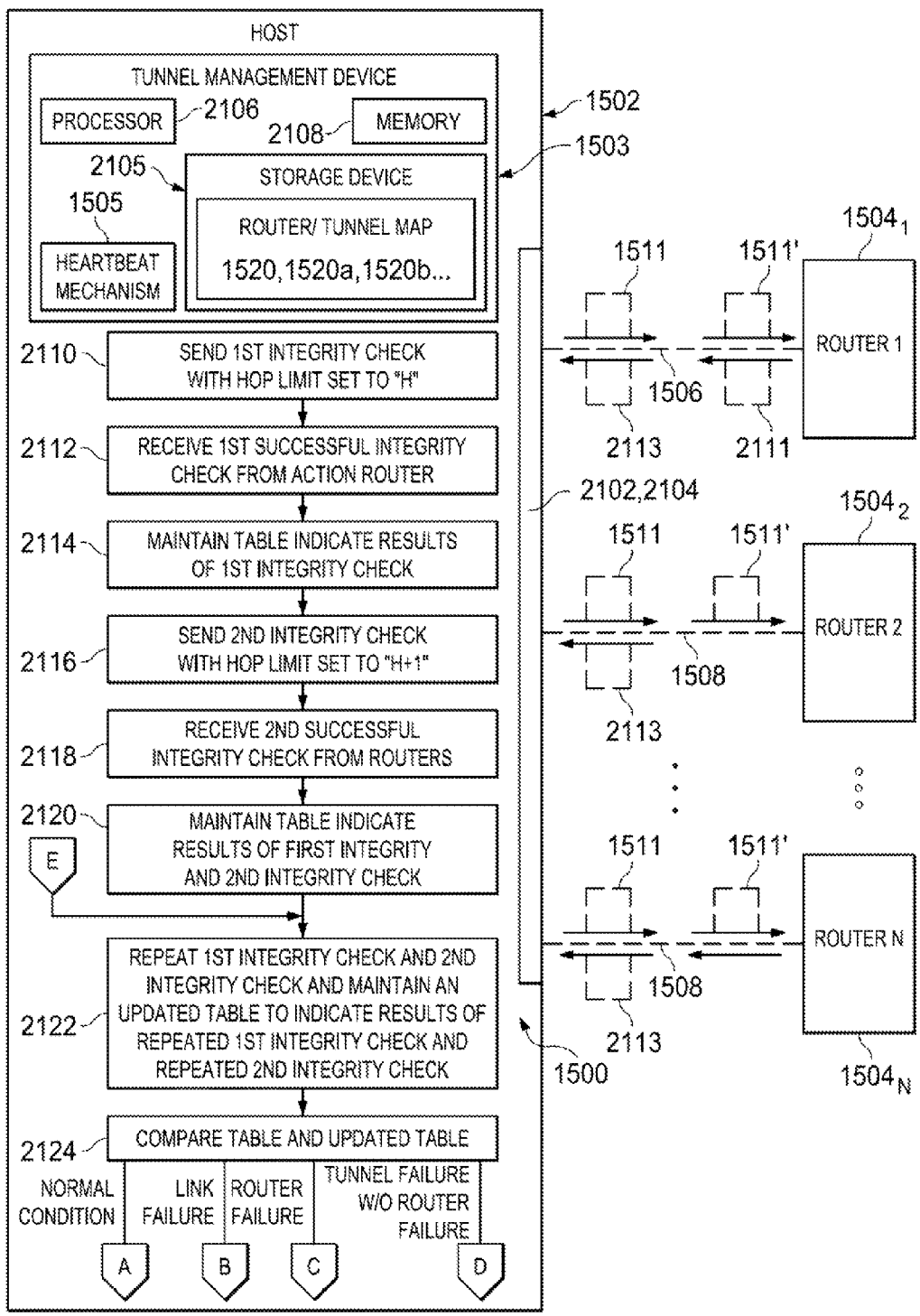
FIG. 21A is a diagram of a host (multiple tunnel management method-flowchart)-routers configuration which is used to explain how the host can implement the multiple tunnel management method in accordance with the second embodiment of the present invention.
Figure 21B:
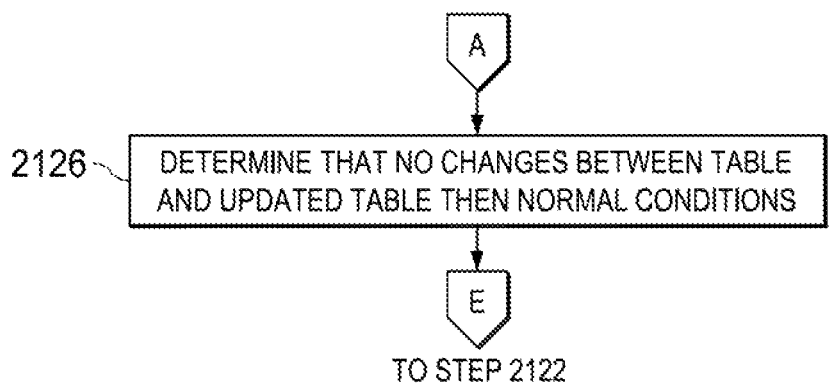
FIG. 21B is a flowchart of an additional step of the multiple tunnel management method shown in FIG. 21A which is used to explain how the host can implement the multiple tunnel management method in accordance with the second embodiment of the present invention.
Figure 21C:
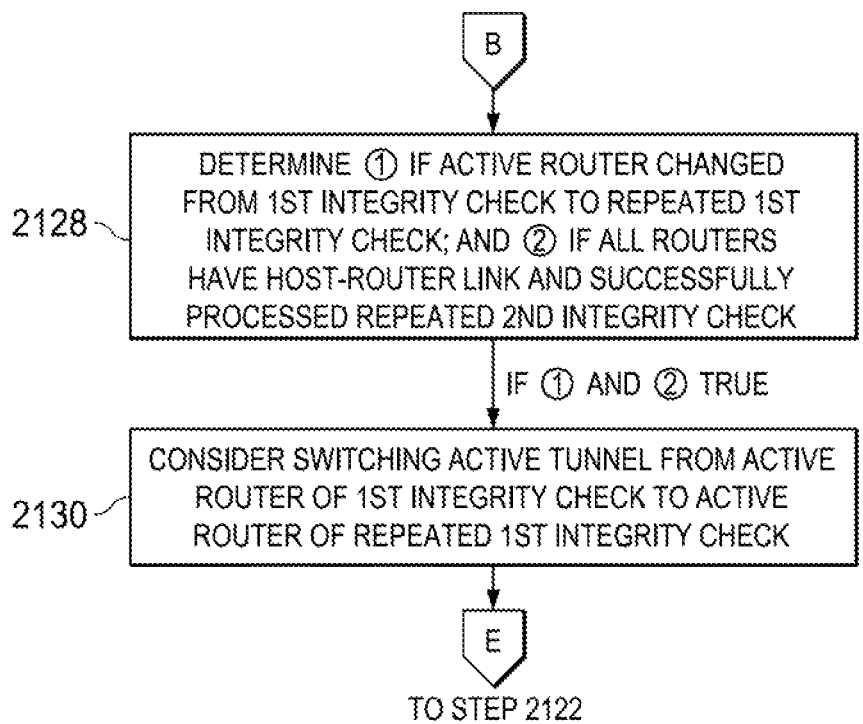
FIG. 21C is a flowchart of additional steps of the multiple tunnel management method shown in FIG. 21A which is used to explain how the host can implement the multiple tunnel management method in accordance with the second embodiment of the present invention.
Figure 21D:
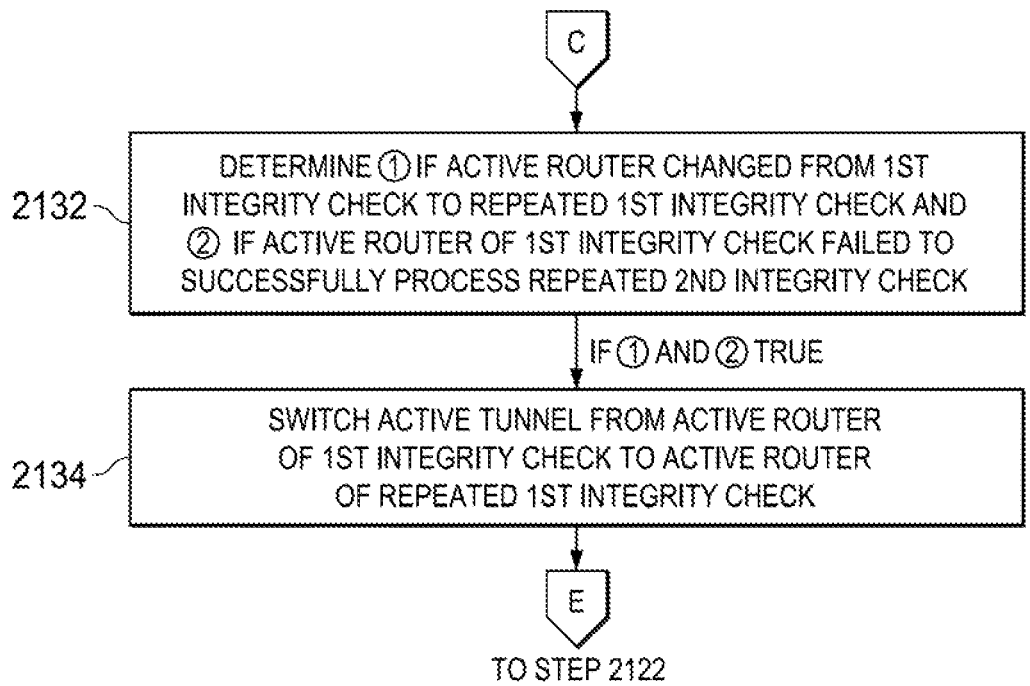
FIG. 21D is a flowchart of additional steps of the multiple tunnel management method shown in FIG. 21A which is used to explain how the host can implement the multiple tunnel management method in accordance with the second embodiment of the present invention.
Figure 21E:
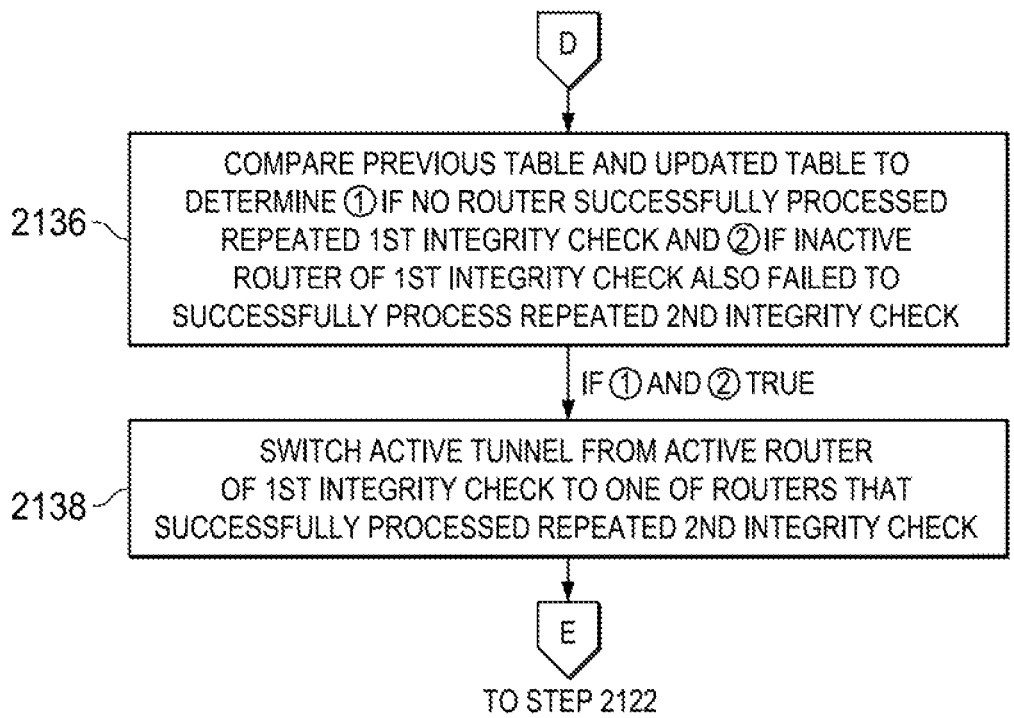
FIG. 21E is a flowchart of additional steps of the multiple tunnel management method shown in FIG. 21A which is used to explain how the host can implement the multiple tunnel management method in accordance with the second embodiment of the present invention.

Referring to FIGS. 20A-20B, there are basic diagrams of the host 1502 connected to the active router 1504$_1$ (R1) and the standby router 1504$_2$ (r2) which are used to explain the tunnel selection after a tunnel failure (without a router failure). If the process managing the tunnel 1514 at the active router 1504$_1$ (R1) fails while the physical link 1506 remains active, then the host's router/tunnel map 1520 will indicate that all of the integrity checks 1511 with hop Limit of H are unsuccessful as shown in TABLE #7 (see FIG. 20A—shows active tunnel 1514 failure). In addition, the integrity check 1511' with hop limit of H+1 also shows a failure with router 1504$_1$ (R1). Hence, the router/tunnel map 1520 of TABLE #7 indicates a problem with router 1504$_1$ (R1) which is either (1) a tunnel failure, or (2) a router and tunnel failure.

TABLE 7

Router/Tunnel Map 1520 with Tunnel Failure (without Router Failure)

| Router/Tunnel | Hop Limit = H | Hop Limit = H + 1 |
|---|---|---|
| R1 | X | X |
| R2 | X | ✓ |
| R3 | X | ✓ |
| . | . | . |
| . | . | . |
| . | . | . |
| Rn | X | ✓ |

✓ Successful Integrity Check
X Unsuccessful Integrity Check

The integrity check 1511 and 1511' with the active router 1504$_1$ and the original active tunnel 1514 fails given the tunnel failure. In this situation, tunnel egress traffic packet 1537 loss will now occur until another tunnel is chosen. The integrity check 1511' with the standby routers 1504$_2$, 1504$_3$ ... 1504$_n$ (R2, R3 ... Rn) presumably succeeds. It should be noted that the integrity check 1511' for the standby routers 1504$_2$, 1504$_3$ ... 1504$_n$ (R2, R3 ... Rn) is "routed" traffic at the active router 1504$_1$ (R1) and not seen as "tunnel" traffic nor handled by the tunneling process. Thus, assuming the routing process is not impacted by the tunneling process on the active router 1504$_1$ (R1) and the increased Hop Limit (H+1) does not warrant discarding the egress packet 1537, then the other integrity checks 1511' will be relayed (routed) to the standby routers 1504$_2$, 1504$_3$ ... 1504$_n$ (R2, R3 ... Rn). The host's router/tunnel map 1520 of TABLE #8 will indicate which tunnels 1534 are available by analyzing the "Hop Limit=H+1" column.

TABLE 8

Router/Tunnel Map 1520 with Hop Limit = H + 1

| Router/Tunnel | Hop Limit = H | Hop Limit = H + 1 |
|---|---|---|
| R1 | X | X |
| R2 | X | ✓ |
| R3 | X | ✓ |
| . | . | . |
| . | . | . |
| . | . | . |
| Rn | X | ✓ |

✓ Successful Integrity Check
X Unsuccessful Integrity Check

The host 1502 must now choose a new available tunnel 1534, e.g., router 1504$_2$ (R2), to transmit data 1537 (see FIG. 20B-shows available tunnel 1534 selection which in FIG. 20A was the standby tunnel 1534). In this case, the host 1502 has no reason to alter its physical path as there is no known issue at the networking layer instead the only issue exists with the tunnel 1514. In fact, the host 1502 may continue to use the standby/newly active tunnel 1534 on a standby router 1504$_2$ (R2) while the physical route 1506 is via the active router 1504$_1$ (R1). This costs an extra hop for the egress traffic 1537 but traffic flow continues.

The routers 1504$_1$ and 1504$_2$ (R1 and R2) handling of ingress traffic 1522a and 1522b destined for the host 1502 under tunnel failure (without router failure) conditions is discussed in detail in the TABLE #9 below.

TABLE #9

Ingress Traffic 1522a and 1522b Behavior Under Tunnel Failure

| Case | Router | Behavior |
|---|---|---|
| A & B | R1 | If traffic 1522a arrives at R1 $1504_1$ with a destination to the host 1502, R1 $1504_1$ cannot route via its tunnel 1514 as that tunnel has failed. R1 $1504_1$ must have a backup route to one, or more, of the other routers R2, R3 . . . Rn and will forward to that router (e.g., R2 $1504_2$). Then, R2 $1504_2$ routes on the host destination address (DA) and discovers it must be tunneled. The R2 $1504_2$ now uses the IPL1 tunnel endpoint address as the new DA. This newly encapsulated packet 1522a will be routed to the host 1502 even if it traverses the active router $1504_1$ (R1) which is currently experiencing a tunnel failure. From the perspective of the active router $1504_1$ (R1), this enveloped packet 1522a with destination address IPL1 is being "routed" and not "tunneled" which implies its success. |
| | R2 | The arriving packet 1522b at R2 $1504_2$ includes the host's DA. R2's routing table will link the host's DA to its tunnel 1534. The packet 1522b will be enveloped and routed via the active router $1504_1$ (R1). |

Alternatively, another option is for the tunneling process of the host 1502 to influence the routing decision of the host 1502 and force a switchover to another physical path. Assuming there is no forced switchover at the data link and physical layer, when the failed tunnel 1514 recovers, then the host's router/tunnel map 1520 will show a successful integrity check 1511 and 1511' with the router $1504_1$ (R1) associated with the active link 1506 as indicated in TABLE #10.

TABLE #10

Router/Tunnel Map 1520 after Tunnel Recovery

| Router/Tunnel | Hop Limit = H | Hop Limit = H + 1 |
|---|---|---|
| R1 | ✓ | ✓ |
| R2 | X | ✓ |
| R3 | X | ✓ |
| . | . | . |
| . | . | . |
| . | . | . |
| Rn | X | ✓ |

✓ Successful Integrity Check
X Unsuccessful Integrity Check

Referring to FIGS. 21A-21E, there is a more detailed diagram of the host 1502 implementing the multiple tunnel management method 1500 in accordance with the second embodiment of the present invention. As shown, the host 1502 is interfaced with multiple next hop routers $1504_1$, $1504_2$ . . . $1504_n$. Plus, the host 1502 includes at least an input interface 2102, an output interface 2104, the tunnel management device 1503 (which includes the heartbeat mechanism 1505), and a storage device 2105 (which stores the router/tunnel map 1520) (note 1: the input interface 2102 and the output interface 2104 can be combined to form an input-output interface) (note 2: the storage device 2105 can be the same as the tunnel management device's memory 2108). The person skilled in the art will appreciate that the host 1502 would include many other well known features and components but for clarity only the components such as the tunnel management device 1503, the heartbeat mechanism 1505 and the router/tunnel map 1520 which are needed to explain the present invention have been described in detail herein.

The tunnel management device 1503 includes a processor 2106 and a memory 2108 that stores processor-executable instructions where the processor 2106 interfaces with the memory 2108 and executes the processor-executable instructions to perform the steps of the multiple tunnel management method 1500. At step 2110, the host 1502 sends a first integrity check 1511 to the next hop routers $1504_1$, $1504_2$ . . . $1504_n$ where the first integrity check 1511 has a hop limit set to "H" so that only the next hop router $1504_1$ (for example) which has an active host-router link 1506 would be able to successfully process the first integrity check 1511 (note: this next hop router $1504_1$ is referred to hereinafter as the active router $1504_1$). At step 2112, the host 1502 receives a first successful integrity check indication 2111 from the active router $1504_1$ only if the active router $1504_1$ has the active host-router link 1506 and was able to successfully process the first integrity check 1511 (note: the remaining next hop routers $1504_2$ . . . $1504_n$ cannot successfully process the first integrity check 1511). At step 2114, the host 1502 maintains in the storage device 2105 the router/tunnel table 1520 which indicates a result of the first integrity check 1511 and in particular which one of the plurality of next hop routers $1504_1$, $1504_2$ . . . $1504_n$ if any is the active router $1504_1$. At step 2116, the host 1502 sends a second integrity check 1511' which has a hop limit set to "H+1" so that all of the next hop routers which has a host-router link 1506 or 1508 would be able to successfully process the second integrity check 1511'. At step 2118, the host 1502 receives a second successful integrity check indication 2113 from each of the next hop routers $1504_1$, $1504_2$ . . . $1504_n$ which have the host-router link 1506 and 1508 and were able to successfully process the second integrity check 1511'. At step 2120, the host 1502 maintains in the storage device 2105 the router/tunnel table 1520 which indicates the result of the first integrity check 1511 and in particular which one of the plurality of next hop routers $1504_1$ if any is the active router $1504_1$, and a result of the second integrity check 1511' and in particular which of the plurality of next hop routers $1504_1$, $1504_2$ . . . $1504_n$ have the host-router link 1506 and 1508 and were able to successfully process the second integrity check 1511'. In this example and up to this point in time, assume there are normal conditions (no failures) and that the next hop router $1504_1$ successfully processed the first integrity check 1511 and all of the next hop routers $1504_1$, $1504_2$ . . . $1504_n$ successfully processed the second integrity check 1511'. At step 2122, the host 1502 then performs another first integrity check 1511 and second integrity check 1511' and maintains an updated router/tunnel table 1520a to indicate the results of the repeated first integrity check 1511 and the second integrity check 1511'.

Thereafter, the host 1502 at step 2124 compares the router/tunnel table 1520 and the updated router/tunnel table 1520a so as to be able to determine if there are normal conditions (see step 2126), a link failure (steps 2128 and 2130), a router failure (steps 2132 and 2134), or a tunnel failure without a router failure (steps 2136 and 2138). How this is done and the subsequent actions if any taken depending on the outcome are discussed next with respect to steps 2128, 2130, 2132, 2134, 2136, and 2138.

After step 2124, the host 1502 at step 2126 determines if there are no changes between the router/tunnel table 1520 and the updated router/tunnel table 1520a then there is a normal condition since there was no change between the first and second integrity checks 1511 and 1511' and the repeated first and second integrity checks 1511 and 1511'. Again, this assumes that the previous router/tunnel table 1520 indicated that there were normal conditions. At this point, the host 1502 returns to step 2122 and repeats the first and second integrity checks 1511 and 1511' and maintains another updated router/tunnel table 1520b which is compared to the previous updated router/tunnel table 1520a to determine if there are normal conditions, a link failure, a router failure or a tunnel failure without a router failure. This process is repeatedly continued.

After step 2124, the host 1502 at step 2128 determines (1) if the active router 1504₁ has changed from the first integrity check 1511 to the repeated first integrity check 1511 and (2) if all of the next hop routers 1504₁, 1504₂ ... 1504ₙ have the host-router link 1506 and 1508 and were able to successfully process the repeated second integrity check 1511'. If the active router 1504₁ has changed from the first integrity check 1511 to the repeated first integrity check 1511' and if all of the next hop routers 1504₁, 1504₂ ... 1504ₙ have the host-router link 1506 and 1508 and were able to successfully process the repeated second integrity check 1511', then the host 1502 at step 2130 considers switching an active tunnel from the active router 1504₁ associated with the first integrity check 1511 to the active router 1504₂ (for example) associated with the repeated first integrity check 1511' since the router/tunnel table 1520 indicates that there has been a link failure between the host 1502 and the active router 1504₁ associated with the first integrity check 1511 (see exemplary scenario associated with TABLE #3). At this point, the host 1502 returns to step 2122 and repeats the first and second integrity checks 1511 and 1511' and maintains another updated router/tunnel table 1520b which is compared to the previous updated router/tunnel table 1520a to determine if there are normal conditions, a link failure, a router failure or a tunnel failure without a router failure. This process is repeatedly continued.

After step 2124, the host 1502 at step 2132 determines (1) if the active router 1504₁ has changed from the first integrity check 1511 to the repeated first integrity check 1511 and (2) if the active router 1504₁ associated with the first integrity check 1511 also failed to successfully process the repeated second integrity check 1511'. If the active router 1504₁ has changed from the first integrity check 1511 to the repeated first integrity check 1511 and if the active router 1504₁ associated with the first integrity check 1511 also failed to successfully process the repeated second integrity check 1511', then the host 1502 at step 2134 switches an active tunnel 1514 from the active router 1504₁ associated with the first integrity check 1511 to the active router 1504₂ associated with the repeated first integrity check since the table indicates that the active router associated with the first integrity check has failed (see exemplary scenario associated with TABLE #5). At this point, the host 1502 returns to step 2122 and repeats the first and second integrity checks 1511 and 1511' and maintains another updated router/tunnel table 1520b which is compared to the previous updated router/tunnel table 1520a to determine if there are normal conditions, a link failure, a router failure or a tunnel failure without a router failure. This process is repeatedly continued.

After step 2124, the host 1502 at step 2136 determines (1) if there is no next hop router 1504₁, 1504₂ ... 1504ₙ that successfully processed the repeated first integrity check 1511 and (2) if the active router 1504₁ associated with the first integrity check 1511 also failed to successfully process the repeated second integrity check 1511'. If there is no next hop router 1504₁, 1504₂ ... 1504ₙ that successfully processed the repeated first integrity check 1511 and (2) if the active router 1504₁ associated with the first integrity check 1511 also failed to successfully process the repeated second integrity check 1511', then the host 1502 at step 2138 switches an active tunnel from the active router 1504₁ associated with the first integrity check 1511 to one of the next hop routers 1504₂ (for example) that had successfully processed the repeated second integrity check 1511' since the table indicates that there was a tunnel failure between the host 1502 and the active router 1504₁ associated with the first integrity check 1511 and that the active router 1504₁ associated with the first integrity check 1511 has not failed (see exemplary scenario associated with TABLE 7). At this point, the host 1502 returns to step 2122 and repeats the first and second integrity checks 1511 and 1511' and maintains another updated router/tunnel table 1520b which is compared to the previous updated router/tunnel table 1520a to determine if there are normal conditions, a link failure, a router failure or a tunnel failure without a router failure. This process is repeatedly continued.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A host which interfaces with at least one of a plurality of next hop routers to communicate with a far end device, the host comprising:
   an input interface;
   an output interface; and
   a tunnel management device arranged to:
      provision a single tunnel to transmit a packet from the output interface to one of the next hop routers, wherein the packet is destined for the far end device;
      wherein the single tunnel terminates at anyone of the next hop routers which has an active link with the host;
      wherein the single tunnel is configured to transmit the packet which contains an original Internet Protocol (IP) header which is encapsulated within a new IP header, where the packet also contains data;
      wherein the original IP header comprises:
         a source IP address indicative of an IP address of the host;
         a destination IP address indicative of an IP address of the far end device;
      wherein the new IP header comprises:
         a source IP address indicative of a tunnel endpoint IP address of the host; and
         a destination IP address indicative of a tunnel endpoint IP address for all of the next hop routers.

2. The host of claim 1, wherein the tunnel endpoint IP address for all of the next hop routers is known only by the host and the next hop routers.

3. The host of claim 1, wherein the original IP header is an IPv6 IP header and the new IP header is an IPv4 IP header, or the original IP header is an IPv4 IP header and the new IP header is an IPv6 IP header, or the original IP header is an IPv4 IP header and the new IP header is an IPv4 IP header, or the original IP header is an IPv6 IP header and the new IP header is an IPv6 IP header.

4. A virtual tunnel method implemented by a host which interfaces with at least one of a plurality of next hop routers to communicate with a far end device, the method comprising the step of:
   provisioning a single tunnel to transmit a packet from the output interface to one of the next hop routers, wherein the packet is destined for the far end device;
   wherein the single tunnel terminates at anyone of the next hop routers which has an active link with the host
   wherein the single tunnel is configured to transmit the packet which contains an original Internet Protocol (IP) header which is encapsulated within a new IP header, where the packet also contains data;

wherein the original IP header comprises:
- a source IP address indicative of an IP address of the host;
- a destination IP address indicative of an IP address of the far end device;

wherein the new IP header comprises:
- a source IP address indicative of a tunnel endpoint IP address of the host; and
- a destination IP address indicative of a tunnel endpoint IP address for all of the next hop routers.

5. The virtual tunnel method of claim 4, wherein the tunnel endpoint IP address for all of the next hop routers is known only by the host and the next hop routers.

6. The virtual tunnel method of claim 4, wherein the original IP header is an IPv6 IP header and the new IP header is an IPv4 IP header, or the original IP header is an IPv4 IP header and the new IP header is an IPv6 IP header, or the original IP header is an IPv4 IP header and the new IP header is an IPv4 IP header, or the original IP header is an IPv6 IP header and the new IP header is an IPv6 IP header.

7. A next hop router which interfaces with a host and one or more other next hop routers, where the host communicates with a far end device through at least one of the next hop router and the one or more other next hop routers, the next hop router comprising:
- an input interface;
- an output interface;
- a tunnel management device arranged to:
  - provision a tunnel to forward a packet originated by the far end device and destined for the host;
- wherein the tunnel is configured to transmit the packet which contains an original Internet Protocol (IP) header encapsulated within a new IP header, the packet also contains data;
- wherein the original IP header comprises:
  - a source IP address indicative of an IP address of the far end device;
  - a destination IP address indicative of an IP address of the host;
- wherein the new IP header comprises:
  - a source IP address indicative of a tunnel endpoint IP address for the next hop router and the one or more other next hop routers; and
  - a destination IP address indicative of a tunnel endpoint IP address for the host; and
- the tunnel management device is further arranged based on there not being an active link between the next hop router and the host to forward the packet by the provisioned tunnel to one of the one or more other next hop routers in order to reach the host.

8. The next hop router of claim 7, wherein the tunnel endpoint IP address for the next hop router and the one or more other next hop routers is known only by the host, the next hop router and the one or more other next hop routers.

9. The next hop router of claim 7, wherein the tunnel manage device is further arranged based on there being an active link between the next hop router and the host to directly forward the packet by the provisioned tunnel to the host.

10. The next hop router of claim 7, wherein the original IP header is an IPv6 IP header and the new IP header is an IPv4 IP header, or the original IP header is an IPv4 IP header and the new IP header is an IPv6 IP header, or the original IP header is an IPv4 IP header and the new IP header is an IPv4 IP header, or the original IP header is an IPv6 IP header and the new IP header is an IPv6 IP header.

11. A virtual tunnel method implemented by a next hop router which interfaces with a host and one or more other next hop routers, where the host communicates with a far end device through at least one of the next router and the one or more other next hop routers, the method comprising the step of:
- provisioning a tunnel to forward a packet originated by the far end device and destined for the host;
- wherein the tunnel is configured to transmit the packet which contains an original Internet Protocol (IP) header encapsulated within a new IP header, the packet also contains data;
- wherein the original IP header comprises:
  - a source IP address indicative of an IP address of the far end device;
  - a destination IP address indicative of an IP address of the host;
- wherein the new IP header comprises:
  - a source IP address indicative of a tunnel endpoint IP address for the next hop router and the one or more other next hop routers; and
  - a destination IP address indicative of a tunnel endpoint IP address for the host; and
- based on there not being an active link between the next hop router and the host, forwarding the packet by the provisioned tunnel to one of the one or more other next hop routers in order to reach the host.

12. The virtual tunnel method of claim 11, wherein the tunnel endpoint IP address for the next hop router and the one or more other next hop routers is known only by the host, the next hop router and the one or more other next hop routers.

13. The virtual tunnel method of claim 11, wherein based on there being an active link between the next hop router and the host, directly forwarding the packet by the provisioned tunnel to the host.

14. The virtual tunnel method of claim 11, wherein the original IP header is an IPv6 IP header and the new IP header is an IPv4 IP header, or the original IP header is an IPv4 IP header and the new IP header is an IPv6 IP header, or the original IP header is an IPv4 IP header and the new IP header is an IPv4 IP header, or the original IP header is an IPv6 IP header and the new IP header is an IPv6 IP header.

15. The next hop router of claim 7, wherein the tunnel management device is further arranged to allow a packet to be received from one of the one or more other next hop routers even though a new IP header's source IP address in the received packet matches a tunnel endpoint IP address of the next hop router.

16. The next hop router of claim 15, wherein the tunnel management device is further arranged to allow the packet to be received from the one of the one or more other next hop routers by one of the following:
- disable a check for duplicate IP addresses; or
- apply a filter which allows receipt of the packet from the one or more next hop routers.

17. The virtual tunnel method of claim 11, further comprising a step of allowing the next hop router to receive a packet from one of the one or more other next hop routers even though a new IP header's source IP address in the received packet matches a tunnel endpoint IP address of the next hop router.

18. The virtual tunnel method of claim 17, wherein the next hop router allows the packet to be received from the one of the one or more other next hop routers by one of the following:
- disabling a check for duplicate IP addresses; or
- applying a filter which allows receipt of the packet from the one or more next hop routers.

19. The host of claim 1, wherein the new IP header comprises the same destination IP address indicative of the same tunnel endpoint IP address for all of the next hop routers.

20. The virtual tunnel method of claim 4, wherein the new IP header comprises the same destination IP address indicative of the same tunnel endpoint IP address for all of the next hop routers.

21. The next hop router of claim 7, wherein the new IP header comprises the same source IP address indicative of the same tunnel endpoint IP address for the next hop router and the one or more other next hop routers.

22. The virtual tunnel method of claim 11, wherein the new IP header comprises the same source IP address indicative of the same tunnel endpoint IP address for the next hop router and the one or more other next hop routers.

* * * * *